United States Patent
Duchscherer et al.

(10) Patent No.: US 9,556,572 B2
(45) Date of Patent: Jan. 31, 2017

(54) SELF-PROPELLED, SINGLE-STAGE SNOWTHROWER

(71) Applicant: The Toro Company, Bloomington, MN (US)

(72) Inventors: Derek S. Duchscherer, Bloomington, MN (US); Nicholas J. Wersal, St. Louis Park, MN (US); Philip G. Stalpes, Remer, MN (US); Nathan J. Friberg, Bloomington, MN (US)

(73) Assignee: The Toro Company, Bloomington, MN (US)

(*) Notice: Subject to any disclaimer, the term of this patent is extended or adjusted under 35 U.S.C. 154(b) by 0 days.

(21) Appl. No.: 14/547,653

(22) Filed: Nov. 19, 2014

(65) Prior Publication Data

US 2016/0138234 A1 May 19, 2016

(51) Int. Cl.
*E01H 5/09* (2006.01)
*B62D 11/02* (2006.01)

(52) U.S. Cl.
CPC ............ *E01H 5/098* (2013.01); *B62D 11/02* (2013.01)

(58) Field of Classification Search
CPC ........... E01H 5/04; E01H 5/098; B62D 11/02; B62D 11/08; A01D 2034/6843
See application file for complete search history.

(56) References Cited

U.S. PATENT DOCUMENTS

| | | | |
|---|---|---|---|
| 1,601,718 A | 10/1926 | Buttweiler | |
| 2,103,510 A | 12/1937 | Brown | |
| 2,735,199 A | 2/1956 | Wanner et al. | |
| 2,768,453 A | 10/1956 | Adams, Jr. | |
| 3,115,714 A | 12/1963 | Johann | |
| 3,213,552 A | 10/1965 | Vanvick | |
| 3,239,954 A | 3/1966 | Brier | |
| 3,253,356 A | 5/1966 | Haban | |
| 3,359,661 A | 12/1967 | Speiser et al. | |
| 3,363,345 A | 1/1968 | Ober | |
| 3,423,857 A | 1/1969 | Ibisch | |

(Continued)

FOREIGN PATENT DOCUMENTS

WO  WO 2010/095234      8/2010
WO  WO 2013/173338 A1  11/2013

OTHER PUBLICATIONS

"Snowhound® 20" Snow Thrower: Reference Drawing and Parts List, Serial Nos. 31300-500001 & Up, 31300-600001 & Up, and 31300-700001 & Up;" Toro Manufacturing Corporation, Minneapolis, MN. 1963; 8 pages.

(Continued)

*Primary Examiner* — Jamie L McGowan
(74) *Attorney, Agent, or Firm* — Mueting, Raasch & Gebhardt, P.A.

(57) ABSTRACT

A self-propelled, single-stage snowthrower wherein, in one embodiment, drive members on each side of the snowthrower provide variable speed propulsion. A transmission that delivers power to the drive members may be adapted to de-clutch one of the two drive wheels when the ground speed of that wheel exceeds the driving speed of the transmission. In other embodiments, the snowthrower includes a rotor having a snow ejection surface forming a negative rake angle. Yet other embodiments include a chute rotation control mechanism that permits manual discharge chute rotation via one-handed input.

18 Claims, 20 Drawing Sheets

(56) References Cited

U.S. PATENT DOCUMENTS

| | | |
|---|---|---|
| 3,452,460 A | 7/1969 | Cope et al. |
| 3,468,041 A | 9/1969 | Mattson et al. |
| 3,488,869 A | 1/1970 | Heth et al. |
| 3,548,522 A | 12/1970 | Roper |
| 3,580,351 A | 5/1971 | Mollen |
| 3,603,008 A | 9/1971 | Heth |
| 3,913,247 A | 10/1975 | Ruhl |
| 3,986,414 A * | 10/1976 | Peterson ............ F16H 37/0853 475/217 |
| 4,068,397 A | 1/1978 | Bacon |
| D251,786 S | 5/1979 | Wildgen |
| 4,190,972 A | 3/1980 | Berner |
| 4,203,237 A | 5/1980 | Enters et al. |
| D260,898 S | 9/1981 | Chieda et al. |
| 4,294,027 A | 10/1981 | Edwards |
| 4,295,285 A | 10/1981 | Stevens |
| 4,300,295 A | 11/1981 | Heismann |
| 4,322,896 A | 4/1982 | Miyazawa et al. |
| 4,325,195 A | 4/1982 | Comer |
| 4,346,526 A | 8/1982 | Mattson et al. |
| 4,360,983 A | 11/1982 | Krug |
| 4,378,644 A | 4/1983 | Tuggle et al. |
| D269,092 S | 5/1983 | Davies, III |
| D270,057 S | 8/1983 | Nakamura |
| 4,397,088 A | 8/1983 | Hampel |
| 4,457,086 A * | 7/1984 | Bacon ................. E01H 5/04 192/3.54 |
| D278,537 S | 4/1985 | Krapowicz et al. |
| 4,514,917 A | 5/1985 | Ogano et al. |
| 4,694,594 A | 9/1987 | Thorud et al. |
| 4,756,101 A | 7/1988 | Friberg et al. |
| 4,852,279 A * | 8/1989 | Gerbrandt ............ E01H 5/045 198/676 |
| D305,125 S | 12/1989 | Hinklin |
| 4,899,471 A | 2/1990 | Sasaki et al. |
| 4,908,968 A | 3/1990 | Thorud et al. |
| D307,912 S | 5/1990 | Yoshida et al. |
| 4,920,734 A * | 5/1990 | Wenzel ................ A01D 34/69 56/11.1 |
| 4,951,403 A | 8/1990 | Olmr |
| D314,775 S | 2/1991 | Yoshida et al. |
| 5,012,907 A * | 5/1991 | Fujioka ................ B60T 1/005 180/6.2 |
| 5,018,592 A * | 5/1991 | Buchdrucker ....... B62D 51/004 180/19.3 |
| RE33,726 E | 10/1991 | Thorud et al. |
| D320,993 S | 10/1991 | Pink et al. |
| 5,052,135 A | 10/1991 | Fontaine |
| 5,083,387 A | 1/1992 | Tillotson et al. |
| D324,524 S | 3/1992 | Beihoffer |
| D326,457 S | 5/1992 | Pink et al. |
| 5,177,888 A | 1/1993 | Thorud et al. |
| 5,315,771 A | 5/1994 | White, III et al. |
| 5,398,431 A | 3/1995 | Beihoffer et al. |
| 5,758,436 A | 6/1998 | Harms |
| 5,966,846 A | 10/1999 | Harms et al. |
| 6,082,083 A | 7/2000 | Stalpes et al. |
| 6,170,179 B1 | 1/2001 | Paytas et al. |
| D448,389 S | 9/2001 | Katoh et al. |
| 6,327,798 B1 | 12/2001 | Sakai et al. |
| 6,341,479 B1 * | 1/2002 | Scag ................. A01D 34/6806 56/11.3 |
| 6,470,602 B2 | 10/2002 | White, III et al. |
| 6,629,590 B2 | 10/2003 | Ochab et al. |
| 6,722,484 B2 | 4/2004 | Ochab et al. |
| D494,193 S | 8/2004 | Martin et al. |
| D498,770 S | 11/2004 | Yuzuriha |
| 6,865,826 B1 | 3/2005 | Lakin |
| 6,968,933 B2 * | 11/2005 | Buckhouse ............ F16D 11/08 192/114 R |
| 7,032,333 B2 | 4/2006 | Friberg et al. |
| 7,257,909 B2 | 8/2007 | Shaffer et al. |
| 7,305,777 B2 | 12/2007 | Kettering et al. |
| 7,377,343 B2 | 5/2008 | Adams, III et al. |
| 7,401,425 B2 | 7/2008 | Friberg et al. |
| 7,472,500 B2 | 1/2009 | White, III |
| D603,428 S | 11/2009 | Tashiro et al. |
| 7,624,521 B2 | 12/2009 | White, III et al. |
| 7,971,695 B2 * | 7/2011 | Vaughn ................ B62D 11/08 192/13 R |
| D642,595 S | 8/2011 | Martin et al. |
| D642,596 S | 8/2011 | Hinklin et al. |
| D675,232 S | 1/2013 | Martin et al. |
| 8,845,486 B2 * | 9/2014 | Raasch ................ F02D 29/06 474/17 |
| 2002/0170209 A1 | 11/2002 | Ruebusch et al. |
| 2002/0189137 A1 | 12/2002 | Cox et al. |
| 2003/0159317 A1 | 8/2003 | Dowe et al. |
| 2006/0150444 A1 * | 7/2006 | Friberg ................ B62D 11/08 37/244 |
| 2007/0251743 A1 * | 11/2007 | Adams ................ B60K 7/0007 180/65.6 |
| 2009/0078085 A1 | 3/2009 | Blanchard |
| 2010/0319223 A1 * | 12/2010 | Wians ................ F16D 13/30 37/244 |
| 2012/0129637 A1 | 5/2012 | Blanchard |
| 2013/0312566 A1 | 11/2013 | Shaffer |
| 2014/0068976 A1 | 3/2014 | Mast et al. |
| 2014/0237864 A1 | 8/2014 | Gilpatrick et al. |
| 2015/0252899 A1 | 9/2015 | Blanchard |
| 2015/0276035 A1 | 10/2015 | Rambaud |
| 2015/0337924 A1 | 11/2015 | Teillet |
| 2016/0084361 A1 | 3/2016 | Barendrecht |

OTHER PUBLICATIONS

"Power Clear 721 R Snowthrower, Model No. 38741—Serial No. 315000001 and Up;" The Toro Company, Bloomington, MN. Form #3385-217 Rev A. 2014; 28 pages.

"Toro® Electric Snowthrowers: 1800 Power Curve®; 1200 Power Curve®; Electric Power Shovel™," The Toro Company, Bloomington, MN. Form #490-5760-C. 1995; 2 pages.

"Electric Snow Thrower—Model 050," MTD LLC, Cleveland, OH. Operator's Manual, Form #769-07058. Apr. 1, 2011, 20 pages.

U.S. Appl. No. 14/547,740, filed Nov. 19, 2014, Friberg et al.

U.S. Appl. No. 14/547,812, filed Nov. 19, 2014, Friberg.

* cited by examiner

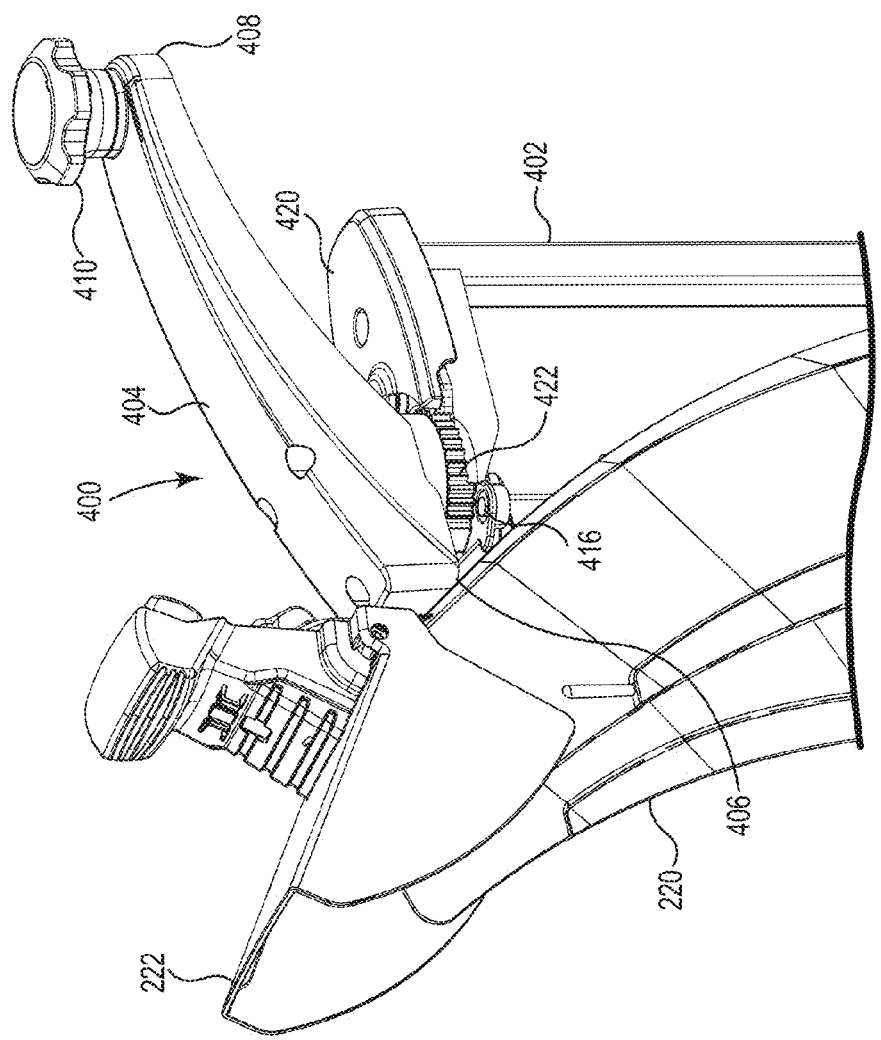

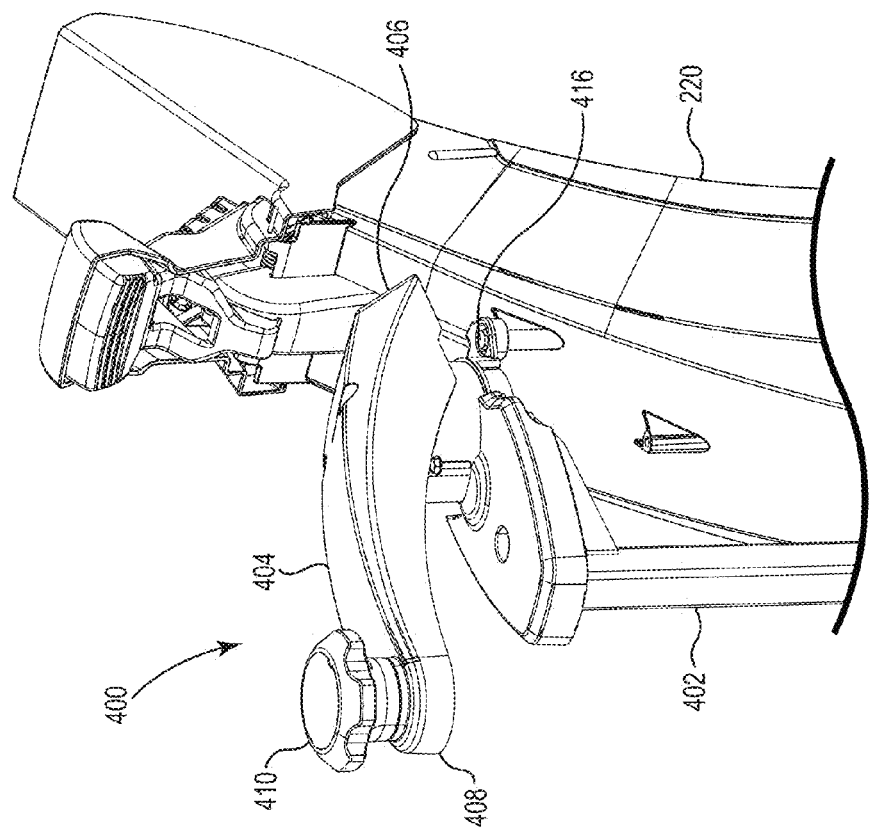

SELF-PROPELLED, SINGLE-STAGE SNOWTHROWER

Embodiments described herein are directed to walk-behind snowthrowers and, more particularly, to a propulsion system for a single-stage snowthrower.

BACKGROUND

Walk-behind snowthrowers typically fall into one of two categories. Two-stage snowthrowers include a horizontally-mounted, rigid helical auger that cuts snow and moves it at a low speed transversely toward a discharge area. Once the snow reaches the discharge area, a higher speed impeller collects and ejects the snow outwardly away from the snowthrower through a discharge chute. Wheels supporting two-stage snowthrowers are typically powered to propel the snowthrower over a ground surface during operation.

Conversely, single stage snowthrowers typically achieve both snow collection and ejection using a horizontally mounted, single-stage high-speed rotor. The rotor may be shaped to move the snow transversely toward a discharge area. At or near the discharge area, the rotor may include paddles configured to directly eject the snow outwardly through a discharge chute.

Typically, the rotor of a single-stage snowthrower is constructed of an elastomeric material. Thus, unlike the auger of a two-stage unit, the rotor may be configured to contact the ground surface during operation. Such contact may assist in propelling the single-stage snowthrower, negating the need for powered propulsion wheels. Passive wheels may still be provided to support the snowthrower in rolling engagement with the ground surface.

SUMMARY

In one embodiment, a snowthrower is provided that includes: a rotor housing defining a collection opening and a discharge outlet; a discharge chute attached to the housing and in fluid communication with the discharge outlet; and a first drive member located near a first side of the housing and a second drive member located near a second side of the housing. A rotor may also be provided. The rotor may be partially enclosed by, and adapted to rotate within, the housing. The rotor is adapted to both: collect snow that enters the housing through the collection opening; and eject the snow through the discharge outlet. A transmission may be provided that includes: an input shaft; and independent first and second output axles operatively connecting the input shaft to the first and second drive members, respectively. A prime mover may be operatively attached to the housing, wherein the prime mover is adapted to provide power to both the rotor and the transmission.

In another embodiment, a snowthrower is provided that includes: a frame having lateral first and second sides; first and second drive members located on or near the first and second sides of the frame, respectively; a rotor housing attached to the frame, the rotor housing defining a partially enclosed volume having a collection opening and a discharge outlet; and a discharge chute operatively attached to the rotor housing and in fluid communication with the discharge outlet. A rotor may also be provided and connected to the rotor housing. The rotor is adapted to rotate about a first axis within the partially enclosed volume, wherein the rotor includes a first portion adapted to transport snow in a direction parallel to the first axis, and a second portion including a paddle offset from, and adapted to rotate about, the first axis. The paddle is adapted to eject the snow outwardly through the discharge chute. A transmission may be attached to the frame and includes: an input shaft; and independent first and second output axles attached to the first and second drive members, respectively. The transmission is adapted to synchronously drive the first and second output axles at a user-selectable, variable speed. A prime mover may be attached to the frame and adapted to provide power to both the rotor and the input shaft of the transmission.

In yet another embodiment, a snowthrower is provided that includes: a frame having first and second sides; first and second drive wheels located on or near the first and second sides of the frame, respectively; a rotor housing attached to the frame, the rotor housing defining a partially enclosed volume having a collection opening and a discharge outlet; and a discharge chute operatively attached to the rotor housing and in fluid communication with the discharge outlet. A rotor may also be provided and connected to the rotor housing. The rotor is adapted to rotate within the partially enclosed volume about a first axis, wherein the rotor includes a first portion adapted to transport snow received through the collection opening, and a second portion also adapted to rotate about the first axis, the second portion adapted to eject the snow outwardly through the discharge chute. A transmission is attached to the frame and includes: an input shaft; and independent first and second output axles attached to the first and second drive wheels, respectively. The transmission is adapted to synchronously drive the first and second output axles, at a variable speed. A prime mover is attached to the frame and adapted to provide power to both the rotor and the input shaft of the transmission.

The above summary is not intended to describe each embodiment or every implementation. Rather, a more complete understanding of various illustrative embodiments will become apparent and appreciated by reference to the following Detailed Description of Exemplary Embodiments in view of the accompanying figures of the drawing.

BRIEF DESCRIPTION OF THE VIEWS OF THE DRAWING

Exemplary embodiments will be further described with reference to the figures of the drawing, wherein:

FIGS. 8A-8B illustrate an exemplary drive system (e.g., transmission) for use with the snowthrower of FIG. 1, wherein: FIG. 8A is a diagrammatic section view of the transmission; and FIG. 8B is a partial perspective view of a jaw clutch of the transmission of FIG. 8A;

FIGS. 15A and 15B are exemplary full section views taken along line 15-15 of FIG. 14, wherein: FIG. 15A illustrates an octagonal discharge outlet; and FIG. 15B illustrates a rectangular discharge outlet;

FIG. 16 is an enlarged left front perspective view of a chute rotation control mechanism in accordance with one embodiment;

FIG. 17 is a right rear perspective view of the chute rotation control mechanism of FIG. 16;

Figure 1:
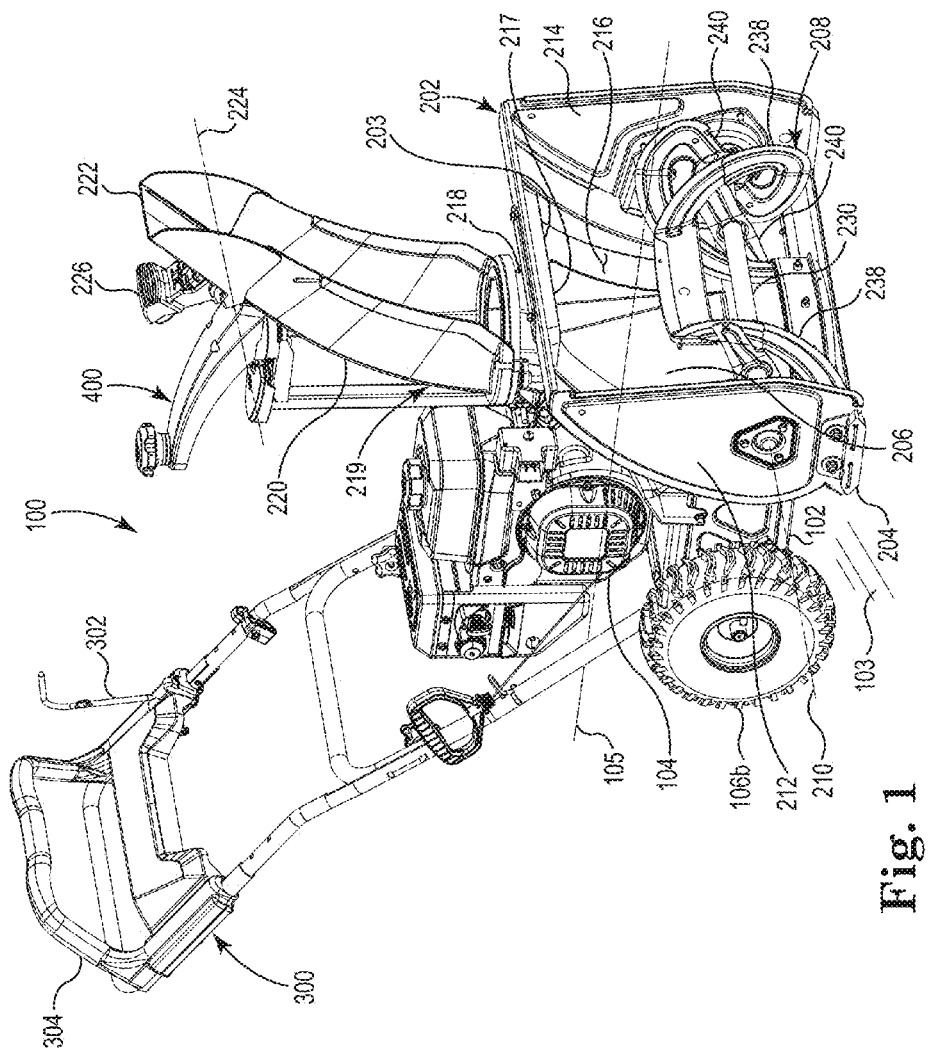
FIG. 1 is a right front perspective view of a snowthrower in accordance with one exemplary embodiment.

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the various exemplary embodiments described. The lack of illustration/description of such structure/components in a particular figure is, however, not to be interpreted as limiting the various embodiments in any way.

DETAILED DESCRIPTION OF EXEMPLARY EMBODIMENTS

In the following detailed description of illustrative embodiments, reference is made to the accompanying figures of the drawing which form a part hereof. It is to be understood that other embodiments, which may not be described and/or illustrated herein, are certainly contemplated.

All headings provided herein are for the convenience of the reader and should not be used to limit the meaning of any text that follows the heading, unless so specified. Moreover, unless otherwise indicated, all numbers expressing quantities, and all terms expressing direction/orientation (e.g., vertical, horizontal, perpendicular, parallel, etc.), in the specification and claims are understood as being modified by the term "about."

Due to their simplicity, single-stage snowthrowers are a cost-effective solution in many snow removal applications. However, they are sometimes perceived as unsuitable for deep or extremely icy snow conditions due to, for example, their flexible rotor, lack of a dedicated second-stage impeller, or their lack of powered drive wheels. Moreover, many single stage snowthrowers utilize a simplistic chute control mechanism that may not enjoy the same convenience and directional control as chute controls typically found on two-stage machines.

Embodiments described and illustrated herein may address some of these issues. For instance, FIG. 1 illustrates a variable speed, self-propelled, single stage snowthrower 100. While so described and illustrated, such a construction is not limiting as aspects of the depicted/described embodiments may find application to other types of snowthrowers (e.g., two-stage) as well as to other types of power equipment.

It is noted that the terms "comprises" and variations thereof do not have a limiting meaning where these terms appear in the accompanying description and claims. Further, "a," "an," "the," "at least one," and "one or more" are used interchangeably herein. Moreover, relative terms such as "left," "right," "front," "fore," "forward," "rear," "aft," "rearward," "top," "bottom," "side," "upper," "lower," "above," "below," "horizontal," "vertical," and the like may be used herein and, if so, are from the perspective of one operating the snowthrower 100 while the snowthrower is in an operating configuration, e.g., while the snowthrower 100 is positioned such that wheels 106 and skids 204 rest upon a generally horizontal ground surface 103 as shown in FIG. 1. These terms are used only to simplify the description, however, and not to limit the interpretation of any described embodiment.

Still further, the suffixes "a" and "b" may be used throughout this description to denote various left- and right-side parts/features, respectively. However, in most pertinent respects, the parts/features denoted with "a" and "b" suffixes are substantially identical to, or mirror images of, one another. It is understood that, unless otherwise noted, the description of an individual part/feature (e.g., part/feature identified with an "a" suffix) also applies to the opposing part/feature (e.g., part/feature identified with a "b" suffix). Similarly, the description of a part/feature identified with no suffix may apply, unless noted otherwise, to both the corresponding left and right part/feature.

As illustrated in FIG. 1, the snowthrower 100 may include a chassis or frame 102 (having first and second lateral sides and defining a centerline longitudinal axis 105) supporting a power source or prime mover, e.g., internal combustion engine 104. One or more (e.g., a pair) of ground support members, e.g., first and second drive members (e.g., wheels 106), may be coupled, one on or near each of a first (e.g., left) and second (e.g., right) side of the frame 102 (only right drive wheel 106b visible in FIG. 1, but see left drive wheel 106a in FIG. 2). As further described below, the wheels 106 may be selectively powered by the engine 104, in one embodiment, to propel the snowthrower 100 over a ground surface 103 in a direction parallel to the longitudinal axis. While described and illustrated herein as using an internal combustion engine, other prime movers (such as an electrical motor) are also possible. The engine 104 may be attached to the frame 102 at a location selected to approximately equalize a weight supported by each of the wheels 106.

The snowthrower 100 may include a housing assembly 200 attached to the frame 102. Among other components, the housing assembly may include a snow-engaging rotor 208 and a rotor housing 202, the latter defining a partially enclosed volume such that the housing may at least partially surround or enclose the rotor. Lowermost portions of the housing 202 (e.g., the skids 204), together with the wheels 106, may form ground contact portions of the snowthrower 100. Stated alternatively, lowermost portions of both drive wheels 106 and the housing 202 may together define an operating plane upon which the snowthrower operates.

Figure 2:
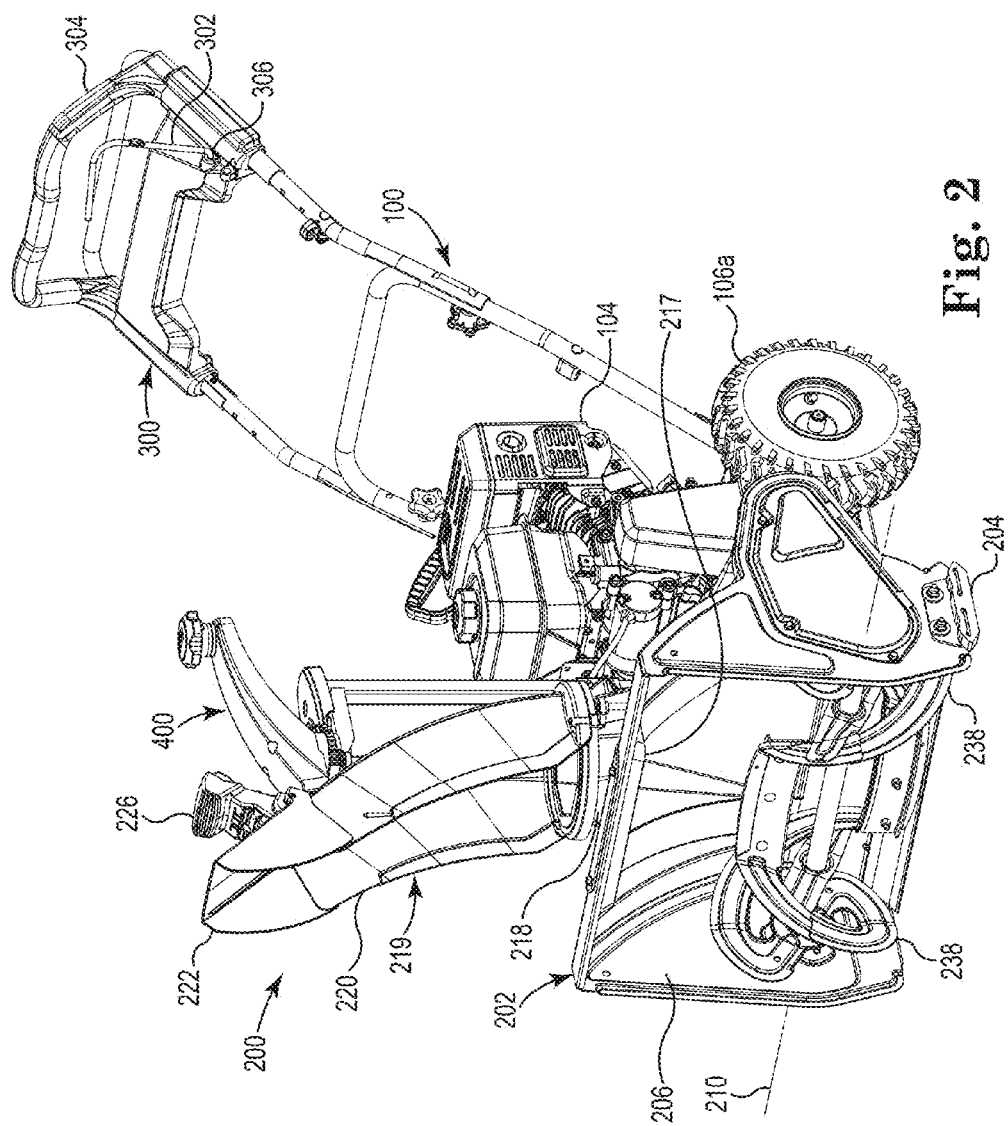
FIG. 2 is left front perspective view of the snowthrower of FIG. 1.

The housing 202 may define a collection opening 206 positioned forward of the rotor 208. The rotor is configured, as described in more detail below, for rotating (e.g., via engine 104 power) within, and relative to, the housing 202 about a transverse or rotor axis 210. The housing 202 may include a pair of spaced-apart sidewalls 212, 214 connected to one another by a rear wall 216 such that the housing forms the generally front-facing collection opening 206 defining a partially enclosed volume or chamber containing the rotor 208. In some embodiments, the rear wall 216 may also form an upper wall of the housing while, in other embodiments, a discrete upper wall may be provided. Regardless of the wall configuration, the rotor may be positioned between the collection opening 206 and the rear wall 216 as shown in FIGS. 1 and 2.

As used herein, "longitudinal axis" or "longitudinal direction" refers to a long axis of the snowthrower 100, e.g., the centerline longitudinal axis 105 extending in the travel or fore-and-aft direction as shown in FIG. 1. "Transverse" or "transverse axis" refers to a direction or axis extending side-to-side, e.g., a horizontal axis that is normal or transverse to the longitudinal axis 105 of the vehicle like the rotor axis 210.

The housing assembly 200 may further include a discharge opening or outlet 217 and a chute assembly 219. The chute assembly 219 may include a discharge passageway or chute 218 operatively attached to the housing 202 such that a lower end of the discharge chute fluidly communicates with the discharge outlet 217 formed in the housing 202 (in the rear wall 216 (or an upper wall) of the housing). Accordingly, the chute 218 may communicate with the partially enclosed volume of the housing 202 and, thus, with the open-face collection opening 206.

In one embodiment, the chute assembly 219 also includes an upper or directional chute 220 operable to rotate, relative to the housing 202, about a chute axis 221 (see FIG. 14) as described below. The directional chute 220 may be attached to the discharge chute 218 as shown. The chute assembly 219 may be used to discharge snow (collected by the rotor 208/housing 202) to a location away from the snowthrower. In one embodiment, the chute assembly 219, e.g., the directional chute 220, may be directionally controlled (e.g., so that the snowthrower discharges to the left, front, right, or anywhere between) by a chute rotation control mechanism 400, an embodiment of which is further described below. The chute assembly 219 (e.g., directional chute 220) may also include an adjustable deflector 222 near an upper end of the directional chute 220 that may pivot about an axis 224, e.g., under the control of a handle 226, to alter a trajectory of the ejected snow. Of course, such a chute and chute control mechanism are exemplary and other embodiments are possible.

FIG. 2 is a perspective view of a left side of the snowthrower 100. As evident in both FIGS. 1 and 2, the snowthrower 100 may include an upwardly and rearwardly extending, generally U-shaped handle assembly 300 that is secured to the frame 102. The handle assembly 300 may form an operator control area for controlling the snowthrower 100, by an operator, from a walk-behind position. For example, the control area may include a rotor control device (e.g., a hand-operated lever or bail 302), and a speed control device 304, both described in more detail below. The bail 302 may pivot about a transverse pivot joint 306 between a disengaged position as shown, wherein the rotor 208 is disengaged or de-coupled from the engine 104, and an engaged position (See FIG. 5), wherein the rotor is operatively engaged or coupled to the engine for rotation about the rotor axis 210.

Rotor Drive and Wheel Propulsion System

Figure 3:
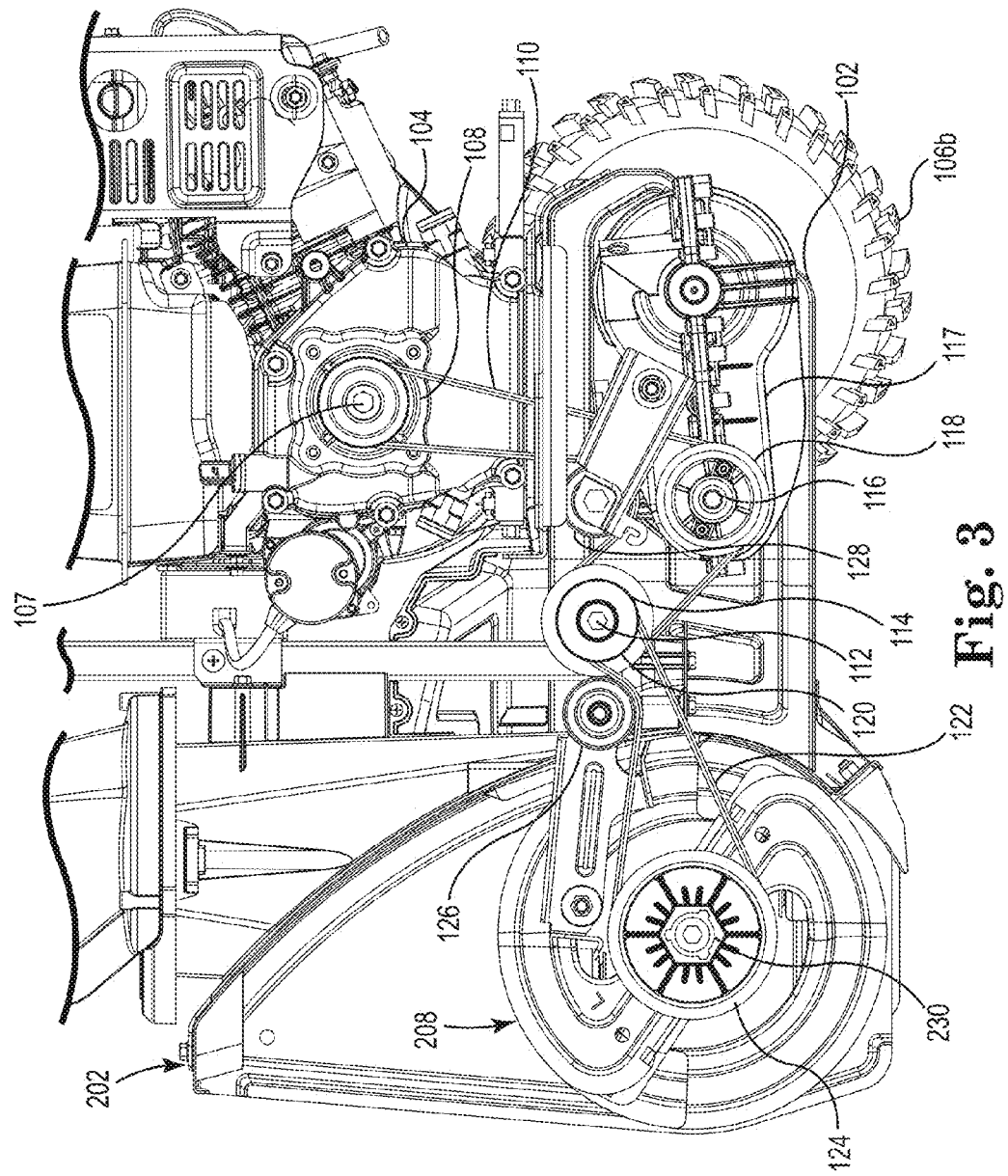
FIG. 3 is a partial cut-away, left-side elevation view of the snowthrower of FIG. 1.
Figure 4:
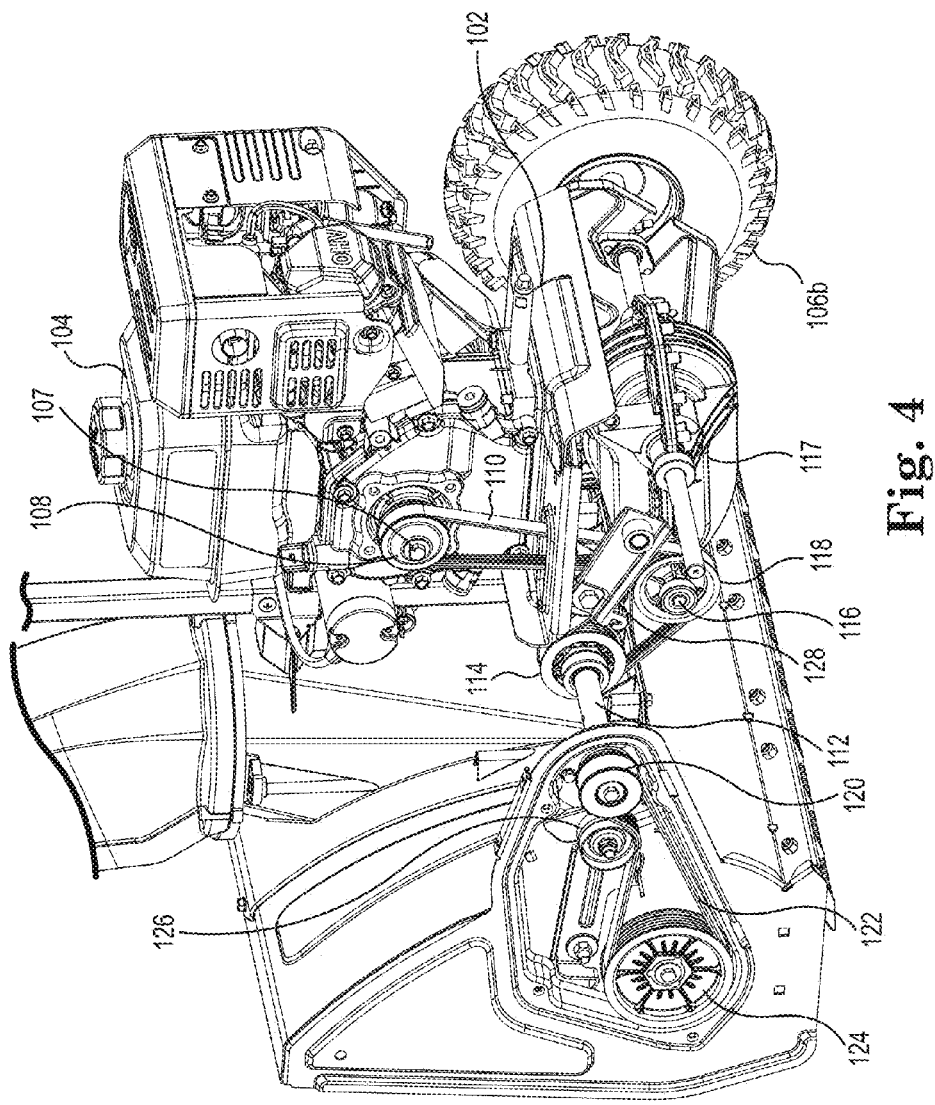
FIG. 4 is left rear perspective view of the snowthrower of FIG. 3.

FIGS. 3 and 4 are a left side, cut-away elevation and a left side cut-away perspective view (both shown with some structure removed), respectively, of a portion of the snowthrower 100. As shown in these views, the engine 104 may have a horizontal output shaft 107 with an attached pulley 108. An endless drive belt 110 may transmit power from the output shaft/pulley 108 of the engine 104 to: a rotor jackshaft 112 via a pulley 114; and to a propulsion or drive system (e.g., to a transmission input shaft 116 of a transmission 117 attached to the frame) via a pulley 118. In one embodiment, the shafts 112 and 116 are oriented parallel to the output shaft of the engine as shown. The rotor jackshaft 112 may extend outwardly to the side as shown in FIG. 4 to support a pulley 120. A rotor belt 122 may engage the pulley 120 and a rotor pulley 124 to transmit power from the rotor jackshaft 112 to the rotor 208.

In the illustrated embodiment, power transmission to the rotor 208 is controlled by a movable idler pulley 126. That is, when the bail 302 is in the engaged position (see FIG. 5), an interconnection mechanism (e.g., a Bowden cable 308 or the like) positioned between the idler pulley 126 and the bail may push or pull the idler pulley (e.g., downwardly in FIG. 3) against the belt, resulting in the belt 122 tensioning sufficiently to transmit rotational power from the pulley 120 to the rotor pulley 124. When the bail 302 is released, a biasing force (e.g., a spring) may cause the idler pulley 126 to reduce its downward pressure on the belt 122, thereby permitting the pulley 120 to rotate without transmitting energy through the belt to the rotor pulley 124.

A second idler pulley 128 may be used to tension the drive belt 110. In the illustrated embodiment, the idler pulley 128 may be configured during manufacture such that it is always biased to an engaged position, i.e., the belt 110 may be configured to always transmit power to the jackshaft pulley 114 and to the pulley 118 when the engine 104 is running. In such an embodiment, the speed of the snowthrower 100 may be controlled by direct manipulation of the transmission 117 itself through a user input, e.g., through the speed control device 304 of FIG. 1, as further described below.

Figure 5:
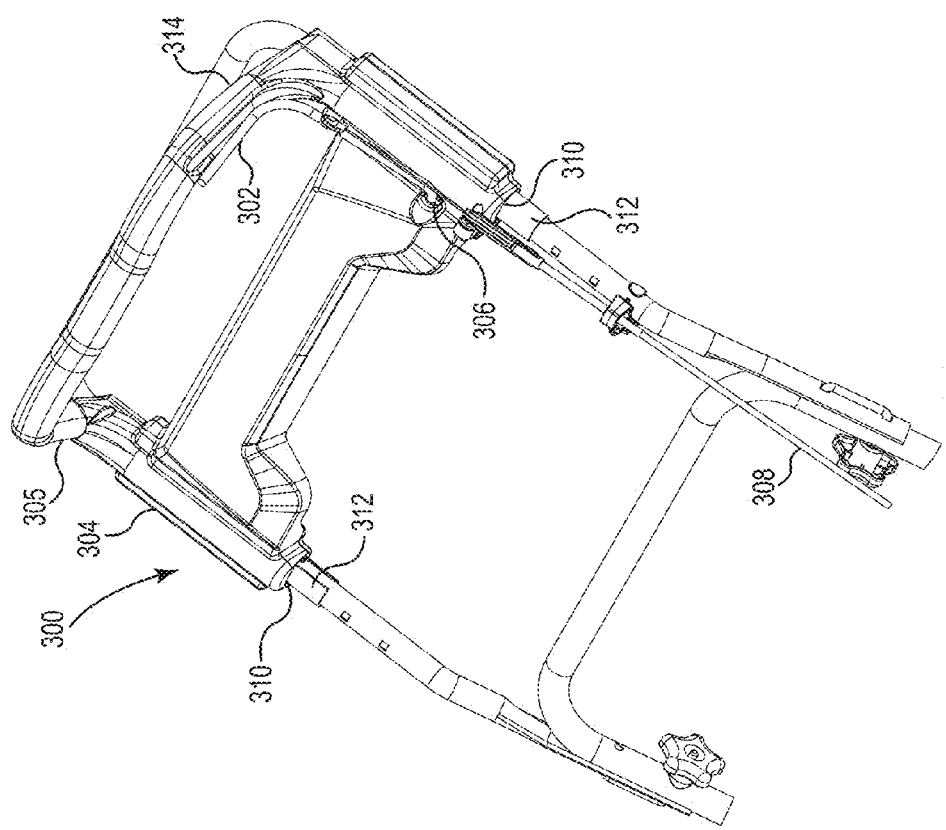
FIG. 5 is a left front perspective view of a snowthrower handle in accordance with one embodiment.
Figure 6:
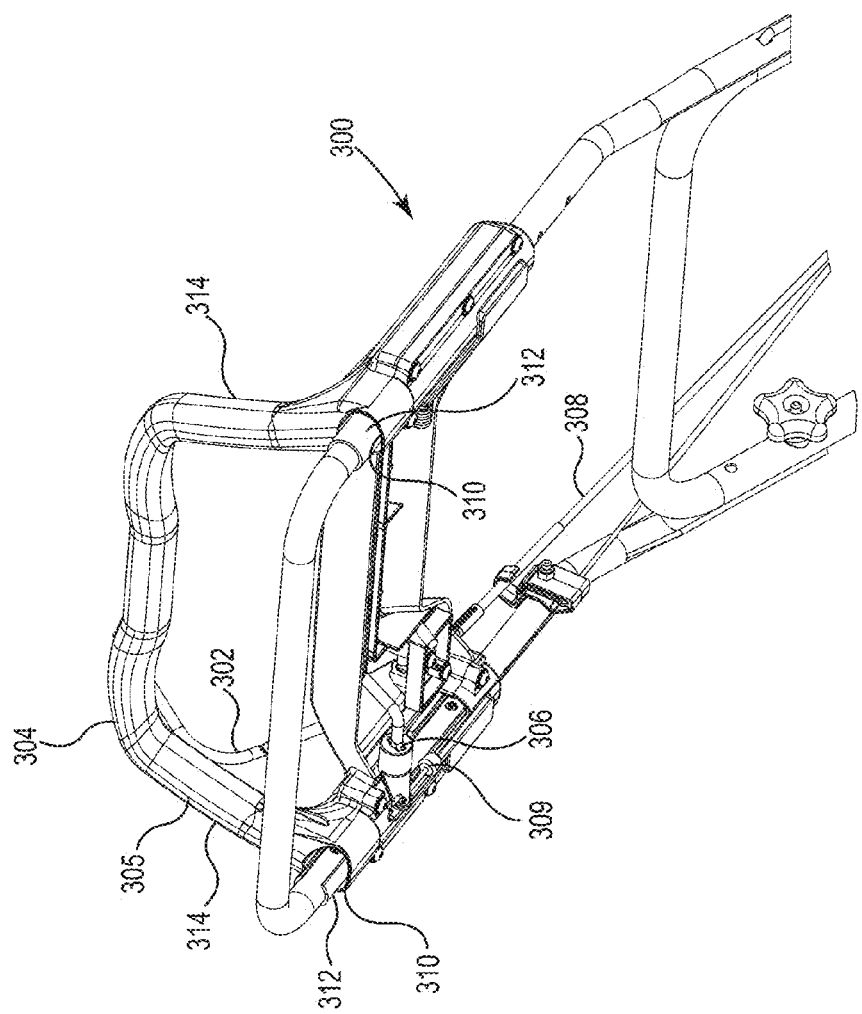
FIG. 6 is right rear perspective view of the snowthrower handle of FIG. 5.

FIGS. 5 and 6 are enlarged front and rear perspective views, respectively, of an upper portion of the handle assembly 300 illustrating the rotor control device (e.g., bail 302) and the speed control device 304. As shown in FIG. 6 and described above, the bail 302 (which is illustrated in the engaged position in FIG. 5) may connect to the idler pulley 126 (e.g., via the cable 308) such that pivoting of the bail about the pivot joint 306 displaces the idler pulley.

As further shown in FIGS. 5 and 6, the speed control device 304 may, in one embodiment, form an ergonomic handle 305 configured to translate or slide along portions of the handle assembly 300. For example, the handle 305 may include passageways 310 that receive therein upper side bars 312 of the handle assembly 300 such that the handle 305 may translate along the side bars 312. In some embodiments, one or both of the passageways 310 and the side bars 312 include alignment and/or friction-reducing components to allow the handle 305 to translate with minimal friction/binding.

The handle 305 may further include upwardly extending (e.g., perpendicular to the slide portions 310) grip portions 314. The exact orientation of the grip portions 314 may be selected to provide the average sized operator with a comfortable grip during snowthrower operation. By providing a grip portion 314 with at least a partially upright configuration as shown, the operator may be well-positioned to impart steering/turning forces to the snowthrower as compared to grip portions that may be more horizontal in construction. By pushing the speed control device 304 forward along the side bars 312 of the handle assembly, an interconnection (e.g., cable 309 of FIG. 6) between the control device and the transmission 117 (see FIG. 7) may cause the transmission to first engage and then increase the speed of both drive wheels 106. A biasing force may return the speed control device 304 (and the transmission) to a neutral position once the pushing force is removed from the control device. Accordingly, the speed control device 304 may both selectively engage and disengage the transmission/drive members, as well as alter the speed of the transmission/drive members.

In other respects, the handle 305 may operate in a manner similar to that described in U.S. Pat. No. 6,082,083 to Stalpes et al.

Figure 7:
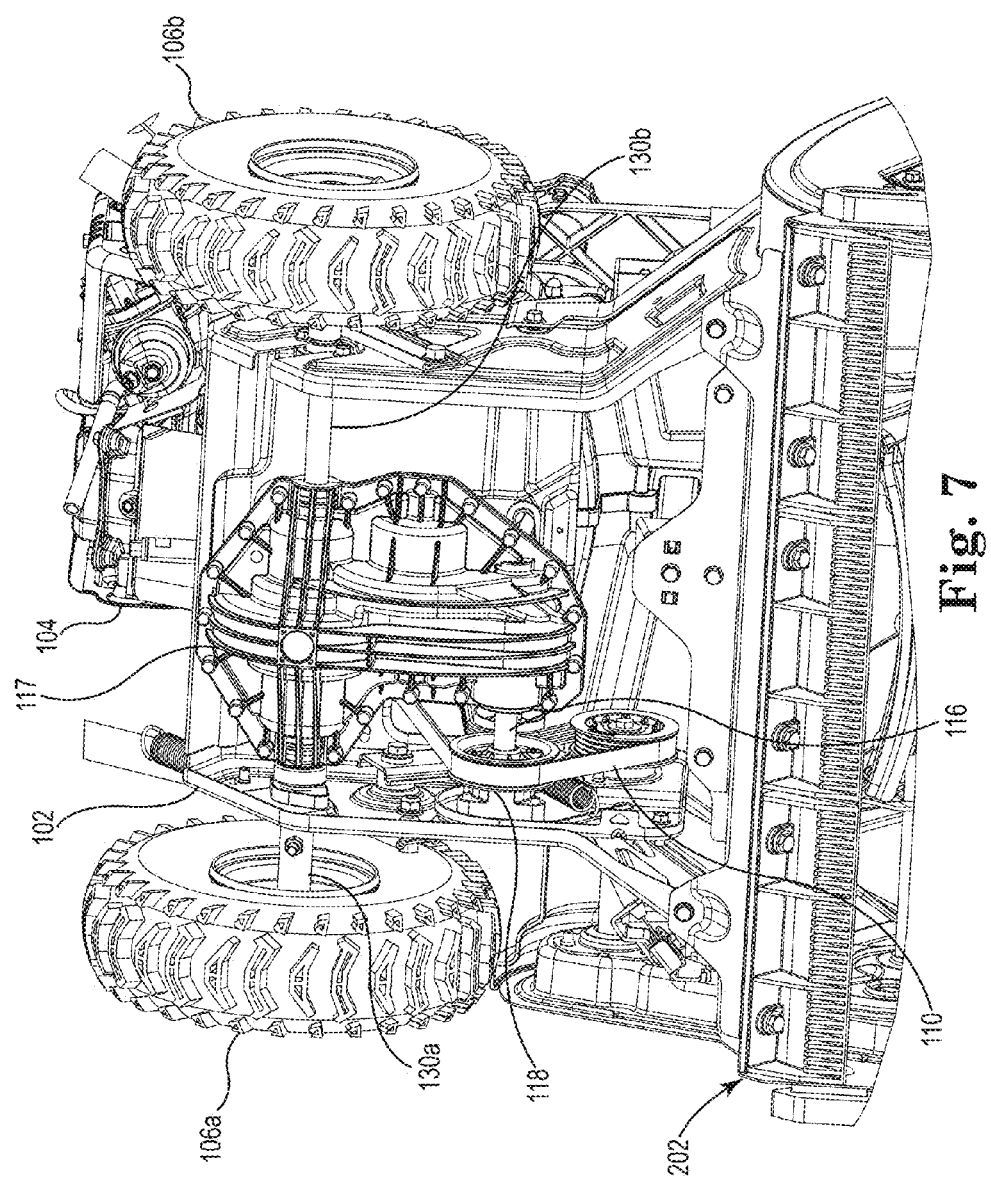
FIG. 7 is a bottom perspective view of the snowthrower of FIG. 1.

FIG. 7 is a bottom perspective view of the snowthrower 100 with some structure removed to better illustrate the drive system including the transmission 117. In one embodiment, the transmission 117 includes the single input shaft 116 (which is powered by the engine) operatively coupled to the first and second drive wheels 106a, 106b by independent first and second output shafts or axles (axle 130a coupled to the drive wheel 106a, and axle 130b coupled to the drive wheel 106b).

The transmission 117 may include a variable speed drive system provided, in one embodiment, by a variable engagement or cone clutch as further described below. Thus, for a fixed (e.g., constant), no-load power level provided to the input shaft 116 (via the pulley 118), the transmission 117 may synchronously drive the output axles 130a, 130b at a user-selectable, variable speed. In one embodiment, the transmission may be able to infinitely or continuously vary the speed of the output axles.

Figure 8A:
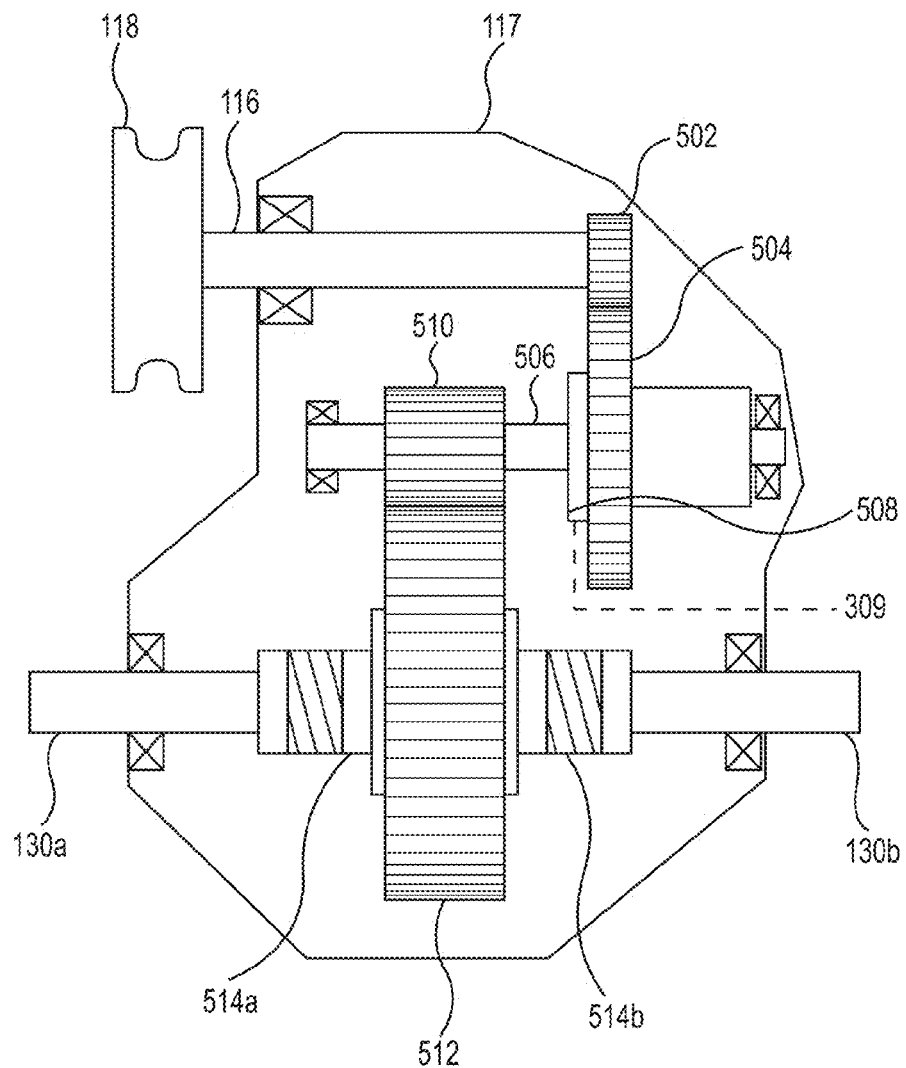

FIG. 8A is a diagrammatic section view of the transmission 117 in accordance with one embodiment. While shown and described with some degree of specificity, the transmission 117 is illustrative only. That is, other transmission configurations are certainly possible without departing from the scope of the described embodiments.

As illustrated in FIG. 8A, the shaft 116 may include a pinion gear 502. As the shaft 116 rotates, the pinion gear 502 may also rotate and, in turn, drive a gear 504. The gear 504 forms a first portion of a variable engagement clutch, e.g., cone clutch 508 or the like, that is in mechanical engagement with the input shaft 116. A second portion of the clutch 508 is attached to an intermediate shaft 506. The cone clutch 508 may vary the magnitude of the speed/torque transmitted to the shaft 506 by the gear 504 (while a speed of the input shaft remains constant) based upon an operator speed input, e.g., based upon the position of the speed control device 304 via the cable 309.

The intermediate shaft 506 may include a pinion gear 510 that drivingly engages an axle gear 512. Stated another way, the axle gear 512 is in mechanical engagement with the second portion of the clutch 508 and is operatively located between the input shaft 116 and the first and second axles 130.

Figure 8B:
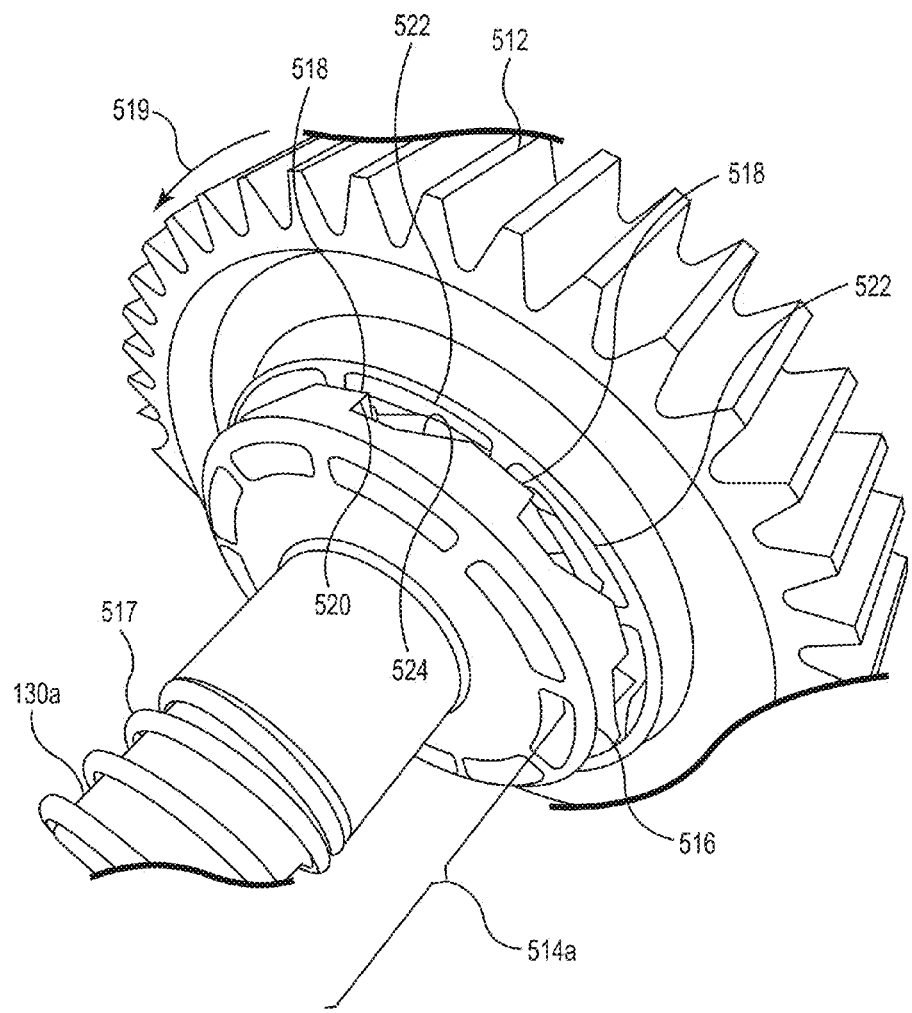

Disposed between the axle gear 512 and each of the output axles 130a, 130b is a jaw clutch 514a, 514b, respectively, which is shown in more detail in FIG. 8B. Each jaw clutch 514 may include a flange portion 516 that is biased toward the axle gear 512 by a spring 517. The flange portion 516 may include one or more protrusions 518. The protrusions may be received within mating passages 522 formed in the axle gear 512. During operation, torque may be transmitted between the axle gear 512 and the flange 516 (in the direction 519) via engagement of the passages with a lip 520 formed on each protrusion 518. The spring 517 may apply a continuous axial biasing force in an attempt to keep the protrusions 518 engaged with the passages 522 during snowthrower operation.

The flange portion 516 may further provide a ramped surface 524 between adjacent protrusions 518 as shown in FIG. 8B. These ramped surfaces permit each jaw clutch to independently de-clutch or disengage its associated shaft 130 from the axle gear 512 (e.g., when a speed of the wheel/axle exceeds a driven speed of the axle gear) by letting the protrusions 518 cam out of engagement with the passages 522. This may occur while the opposite jaw clutch remains engaged with the axle gear.

Such a configuration allows one shaft 130 to spin faster than the axle gear 512 (and thus faster than the other shaft 130), thereby allowing the operator to force the snowthrower to turn (e.g., by manually imparting a turning force to the snowthrower). Moreover, when the snowthrower is pushed by the operator at a speed faster than the axle gear 512 is driving, both jaw clutches (514a, 514b) may de-couple from the axle gear. Once the snowthrower slows to a speed equal to the driven speed of the axle gear, the springs 517 may force the flange portions 516 to re-engage with the axle gear, at which point both axles 130 will again be driven by the transmission.

Housing Assembly

Figure 9:
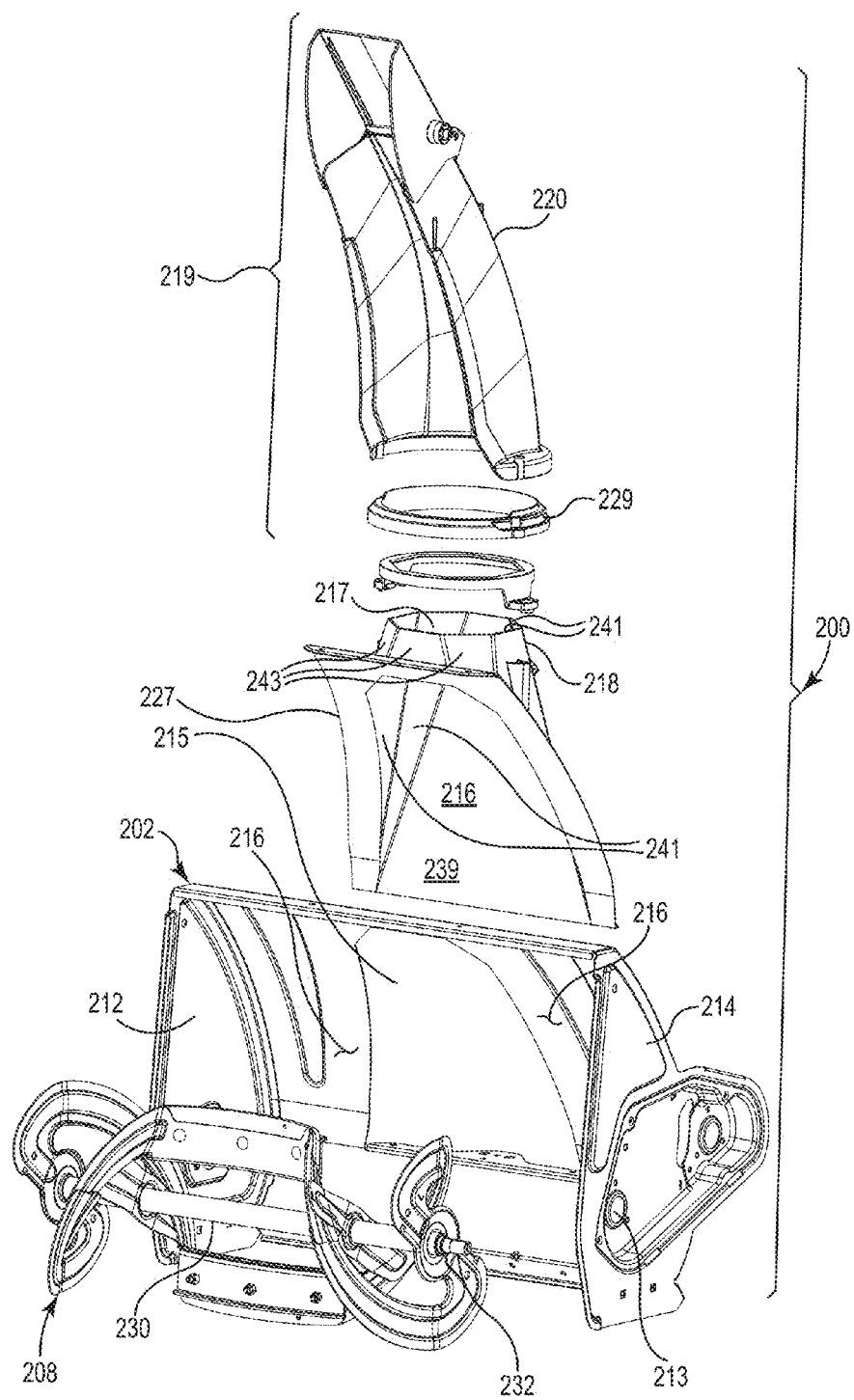
FIG. 9 is an exploded view of a snowthrower housing assembly in accordance with one embodiment.

In order to collect and remove snow during snowthrower 100 operation, the rotor 208 may rotate about the transverse rotor axis 210 (see FIG. 1) within the housing 202. FIG. 9 is an exploded view of an exemplary housing assembly 200 that includes, among other components, the housing 202, the chute assembly 219, and the rotor 208.

As shown in FIG. 9, the rear wall 216 of the housing 202 may, in one embodiment, include an opening 215. In this embodiment, this missing portion of the rear wall 216 (created by the opening 215) is formed by a cover 227 that, near its top, forms the discharge chute 218. While not wishing to be bound to any specific construction, the cover 227 may, in one embodiment, be injection molded plastic and mechanically attached to the housing 202 with fasteners or the like. In other embodiments, the cover 227 may be made of a different material (e.g., metal) that could be welded or otherwise permanently attached to the housing. In still other embodiments, the housing 202 and cover 227 may be formed as a single component. Regardless of the actual construction, the term "housing," as used herein, is understood to include both the housing 202 with the attached cover 227.

As indicated elsewhere herein, the housing assembly 200 may also include the chute assembly 219, e.g., the discharge chute 218 and the directional chute 220. In the illustrated embodiment, the chute assembly 219 may also include various components such as adapter 229 that permit attachment of the directional chute 220 to the discharge chute 218 in a manner that permits the former to rotate relative to the latter.

Figure 10:
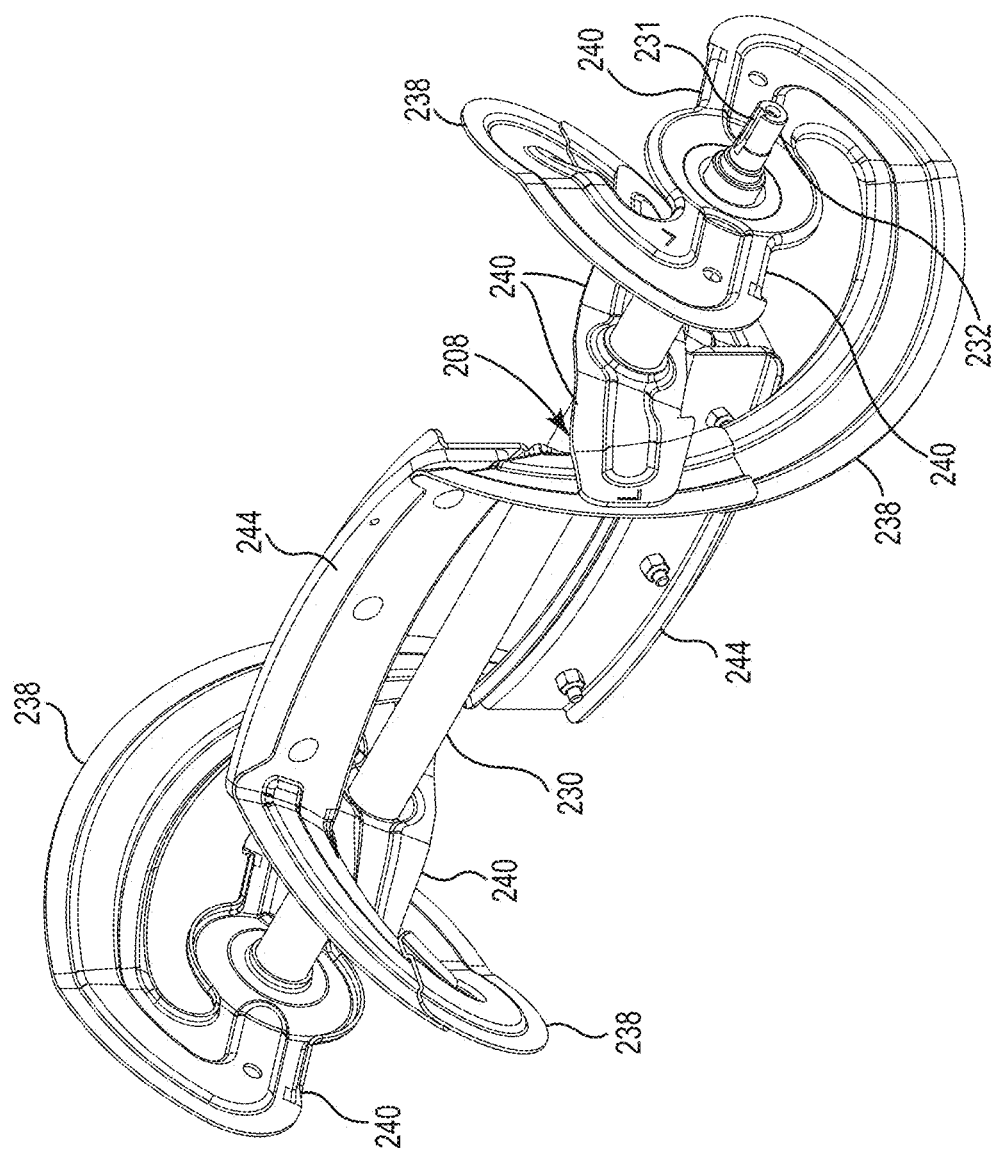
FIG. 10 is a perspective view of a snowthrower rotor in accordance with one embodiment.

FIG. 9 further illustrates the rotor 208 exploded from the housing 202, while FIG. 10 provides an enlarged view of the exemplary rotor 208. As shown in these views, the components that form the rotor 208 may be fixed to a rotor drive shaft 230 in most any acceptable manner e.g., welding. Alternatively, the rotor components could be attached to a hollow shaft that is then slid over the drive shaft 230 and secured via one or more shear pins (not shown). In fact, the exact method of securing the rotor components (described below) to the drive shaft may vary as long as the rotor components may effectively move in unison with the drive shaft during operation.

As best viewed in FIG. 10, the drive shaft 230 may include a first end 232 that extends through an opening 213 formed in the sidewall 214 of the housing 202 (see FIG. 9) and is journalled for rotation relative to the sidewall, e.g., with bearings or the like. While not visible, the opposite or second end of the drive shaft 230 may be similarly journalled for rotation to the sidewall 212 (see also FIG. 9). The first end 232 may include features, e.g., splines or a keyway 231, that allows mechanical coupling of the first end to the rotor pulley 124 located on an outboard side of the sidewall 214 (not shown in FIG. 9, but see FIG. 3). As a result, when the idler pulley 126 (see FIG. 3) is placed in the engaged position with the engine 104 running, the drive shaft 230, and thus the rotor 208, rotates.

Figure 11:
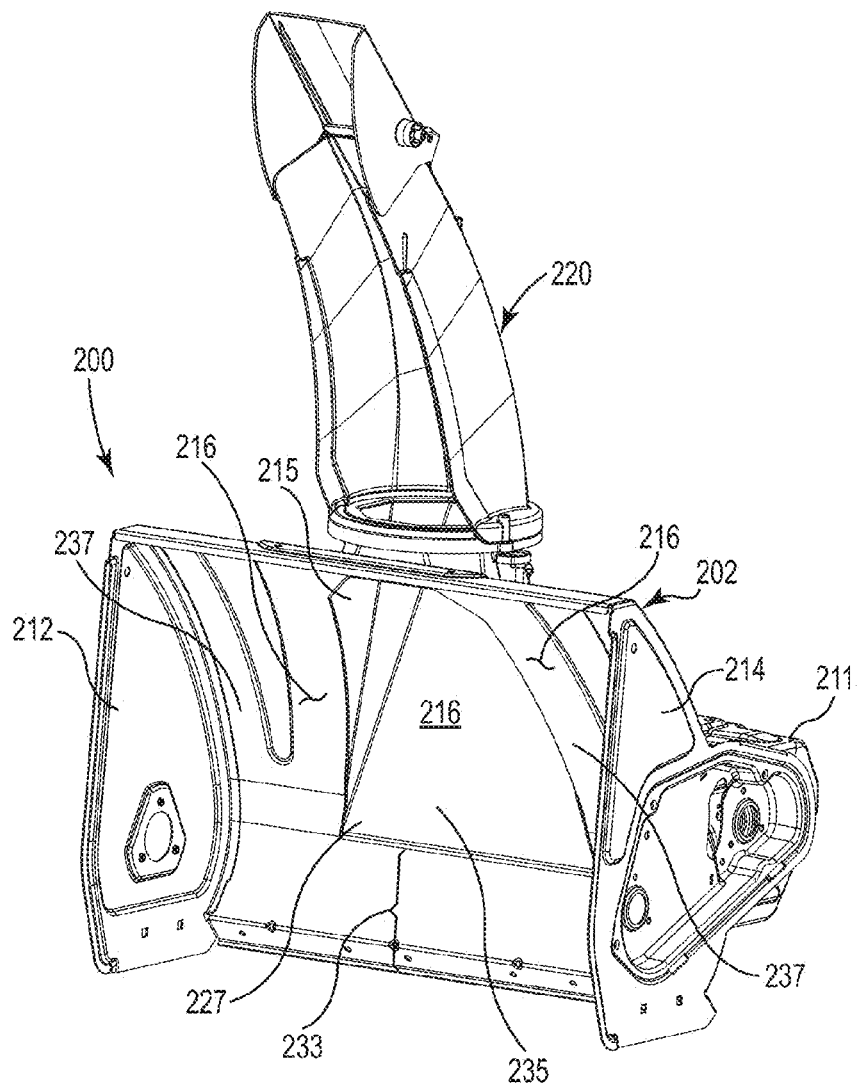
FIG. 11 is a perspective view of the housing assembly of FIG. 9 as assembled but without the rotor.
Figure 12:
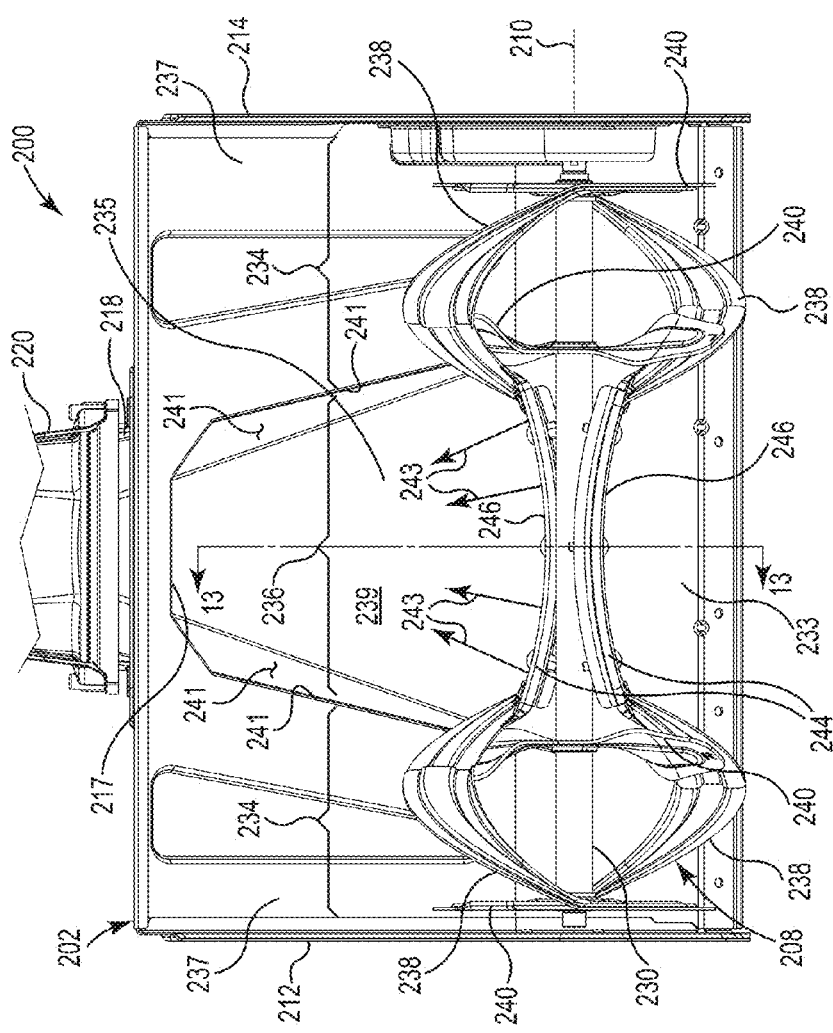
FIG. 12 is a front elevation view of the snowthrower housing assembly of FIG. 9 as assembled.

FIG. 11 illustrates the housing assembly 200, e.g., the assembled housing 202 and chute assembly 219 (the rotor 208 being removed from this view). As shown in this view, the housing assembly 200 may include attachment structure 211 to permit attachment of the housing 202 to the frame 102 (not shown). Moreover, this figure also illustrates that the interior surface of the rear wall 216 of the housing may include a lower semi-cylindrical portion 233 having a shape that corresponds to, but is offset from, a surface of revolution defined by the rotor 208 (e.g., by the flytes 238 described below). The interior surface of the rear wall 216 may further define upper curved portions 237, primarily in the region outboard of the opening 215/cover 227. Located between the two upper curved portions 237, the rear wall 216 further defines a recessed transition zone 235 as shown in FIGS. 11 and 12. The transition zone 235 is described in more detail below.

Figure 13:
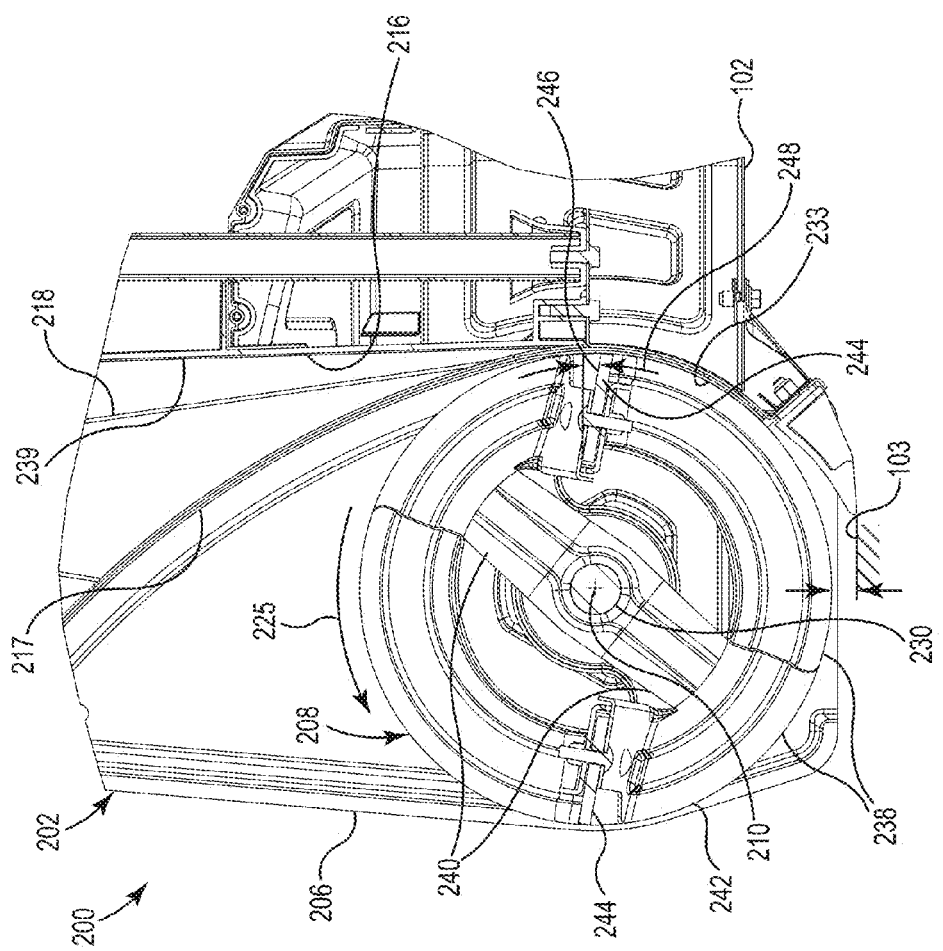
FIG. 13 is a section view taken along line 13-13 of FIG. 12.

FIGS. 12 and 13 illustrate, respectively, a front view of the housing assembly 200, and a section view taken along line 13-13 of FIG. 12. With reference first to FIG. 12, the housing 202 and the rotor 208 may each be divided generally into first or snow collecting portions 234, and a second or discharge portion 236. While described as having a discharge portion separate from a snow collecting portion, it is understood that the housing 202 and the rotor 208 are operable to "collect" snow across an entire housing/rotor width, e.g., the discharge portion 236 may also "collect" snow during operation. The collecting portions 234, which may generally align transversely with the upper curved portions 237, define areas where snow is gathered upon entering the housing 202 (via the collection opening 206) as the snowthrower is propelled forwardly. These collecting portions 234 of the rotor and housing work to move the snow, e.g., in a direction parallel to the rotor axis 210, toward the discharge portion 236.

In the illustrated embodiment, the discharge portion 236 is located toward the center of the rotor/housing 202. As a result, collecting portions 234 are provided on each outboard side of the discharge portion 236. However, embodiments wherein only one collecting portion, and/or more than one discharge portion, are contemplated. In general, the collecting portions 234 of the rotor 208 are adapted to work in conjunction with the corresponding portions of the snowthrower (e.g., semi-cylindrical lower portion 233 and upper curved portion 237) of the housing 202, while the discharge portion 236 is adapted to work in conjunction with the discharge portion of the housing (e.g., the transition zone 235) as further described below.

Each collecting portion 234 of the rotor may include one or more flytes 238 as shown in FIGS. 10 and 12. Each flyte 238 may be secured to the drive shaft 230 such that it rotates with the shaft 230. In one embodiment, each flyte 238 connects to the drive shaft 230 via one or more radial legs 240. For example, each collecting portion 234 of the rotor may be formed by two flytes 238, wherein each of the flytes is connected to the drive shaft 230 by two radial legs 240.

Once again, the flytes 238 are adapted, when rotating, to collect snow entering the housing 202 through the collection opening 206 and transport it (in a direction parallel to the rotor axis 210) toward the discharge portion 236 of the rotor 208 (e.g., toward the transition zone 235 of the housing). To accomplish this, each flyte 238 may form a partial helix as perhaps best shown in FIG. 12. Unlike many conventional single-stage rotors, each flyte 238 may have a generally constant helix angle over its effective length (e.g., between its first and second ends). Moreover, the helix angle of the flytes 238 on a first side of the discharge portion 236 may be opposite of the helix angle of the flytes on the second, opposite side of the discharge portion. As a result, both sides of the rotor 238 may move snow toward the central discharge portion 236 as the rotor rotates. While various helix angles may provide the desired performance, the helix angle may, in one embodiment, be between 40 and 70 degrees.

Unlike conventional single stage snowthrowers, the snowthrower 100 does not rely upon rotor 208/ground contact for propulsion. Rather, the drive wheels 106, as described above, may propel the snowthrower during operation. Accordingly, the rotor 208 may be spaced-apart from the ground surface 103 such that a surface of revolution 242 defined by an outermost edge of the rotor (as it rotates about the axis 210) is offset from the operating plane formed by the ground surface 103 as shown in FIG. 13. Moreover, because the flytes 238 are not ground contacting, they may (along with the radial legs 240) be constructed of a first, rigid material (e.g., metal) permanently fixed to (e.g., welded), or otherwise formed integrally with, the drive shaft 230. This stands in contrast to the flexible rotor components found on conventional single-stage snowthrowers.

Each of the collecting portions 234 of the rotor 208 may terminate at the discharge portion 236 (see FIG. 12), which, as stated above, may be located centrally along the rotor proximate the transition zone 235. Unlike the helical flytes 238, the discharge portion 236 of the rotor may define one or more paddles 244 adapted to forcefully eject snow (e.g., provided by/received from the collecting portions 234) outwardly through the discharge outlet 217/chute 218. In one embodiment, two paddles are provided and offset from one another by 180 degrees (see, e.g., FIGS. 10 and 13). As shown in these views, the paddles are offset from, and adapted to rotate about, the rotor axis 210.

Each paddle 244 may further form a concave ejection surface 246 as illustrated in FIG. 12. That is, a midpoint of the snow ejecting surface 246 may trail the laterally outermost left and right ends (ends of the surface 246 closest to the flytes 238) of the surface 246 as the rotor rotates during operation. As a result, moving outwardly to either side from the midpoint of the snow ejecting surface 246, snow will be ejected at a gradually increasing inward angle as indicated by the arrows 243 (the latter representing the resultant force applied to the snow by the rotor 208/ejection surface 246). In the illustrated embodiment, the snow ejection surface 246 may be narrower in width (e.g., measured parallel to the axis 210) than a lowermost edge of the transition zone 235 (see, e.g., FIG. 12).

In one embodiment, the helical flytes 238 are made from the first material (e.g., metal) having a first thickness, while the snow ejection surface 246 is made of a second material of greater compliance (e.g., elastomer such as rubber) having a second thickness that is, in one embodiment, two or more times greater than the first thickness (i.e., the flytes may have a thickness that is 50% or less than a thickness of the paddles 244). As a result, the flytes 238 may potentially be better suited to cut through icy snow than the elastomeric, thicker flytes of a typical single-stage rotor.

A portion of the rear wall 216 of the housing 202 may, as described above, form the transition zone 235 that assists with receiving and transitioning snow (delivered by the flytes 238) for vertical ejection by the ejection surface 246 of the rotor 208. In the illustrated embodiment, the transition zone 235 may take the shape of an inverted funnel when viewed from the front as shown in FIG. 12 (e.g., wide near the paddle 244 and tapering inwardly toward the outlet 217). As shown in this view, the transition zone 235 (e.g., the cover) may include a rear surface 239 (forming part of the rear wall 216 of the housing 202), and two or more quadrilateral planar transition walls 241 (see also FIG. 9). The transition walls 241 may connect the surface 239 to the rest of the rear wall 216 such that the opening 215 (see FIG. 9) of the housing is completely enclosed (e.g., by the cover 227). As indicated in FIG. 12, the transition zone 235 may terminate at the outlet 217.

The result of the exemplary construction of the rotor 208 and the transition zone 235 shown herein is that, at least during normal (stead-state) operation, snow is brought to the transition zone 235 by the flytes 238 (or collected directly by the paddles 244) and is then ejected upwardly along the surface 239 such that the ejected snow converges as it moves toward the outlet 217. Stated alternatively, the shape of the snow ejecting surface 246, along with the shape of the rear surface 239 and the transition walls 241, may direct or focus ejected snow so that it more effectively enters the discharge chute 218 as compared to a chute having a round cross-sectional shape.

FIG. 13 illustrates that a lower end of the rear surface 239 of the transition zone 235 may intersect generally tangentially with the semi-cylindrical lower surface 233 of the housing 202 (in practice, the transition zone may be offset from the lower surface slightly due to variability in manufacturing (e.g., tolerances) and assembly). As a result, the surface 239 extends upwardly towards the outlet 217 of the discharge chute 218 at an angle that is tangent to the outermost radial edge of the ejecting surface 246 (e.g., normal to the operating plane/ground surface 103).

As further shown in FIG. 13, in addition to extending generally along the axis 210 and possessing the concave shape described above, the ejection surface 246 may also be canted or inclined to form a rake angle 248. While a range of rake angles are contemplated, the rotor 208 of the illustrated embodiment may have a negative rake angle, e.g., the surface 246 may slant such that an innermost radial edge of the surface 246 (closest to the axis 210) leads an outermost radial edge of the surface 246 as the rotor rotates (e.g., in a first or operating direction 225). Stated alternatively, the outermost radial edge of the snow ejecting surface 246 that lies on a plane normal to the axis 210 (e.g., see the view of FIG. 13) may trail the innermost radial edge of the surface 246 also lying on the plane when the rotor is rotating in the direction 225. In one embodiment, the rake angle 248, which remains constant during rotor rotation, may be −5 to −25 degrees, and in another embodiment, may be −5 to −15 degrees. While the rake angle 248 is fixed, it may vary at different transverse locations along the snow ejecting surface 246. For example, the rake angle may, in one embodiment, be −9 degrees at the center of the snow ejecting surface 246 (as shown in FIG. 13), yet be closer to −13 degrees near the outermost ends of the surface 246 (e.g., near the flytes 238).

It is believed that the negative rake angle of the paddles 244/ejection surfaces 246 provides various benefits. For instance, the negative rake angle may assist it discharging the snow in a direction that is away from the paddle (e.g., outwardly from the surface of revolution 242 formed by the rotor). As a result, snow may be ejected upwardly through the outlet 217 and into the discharge chute 218 as opposed to potentially being carried around to the front of the rotor 208 and ejected forwardly through the collection opening 206 of the housing 202.

Figure 14:
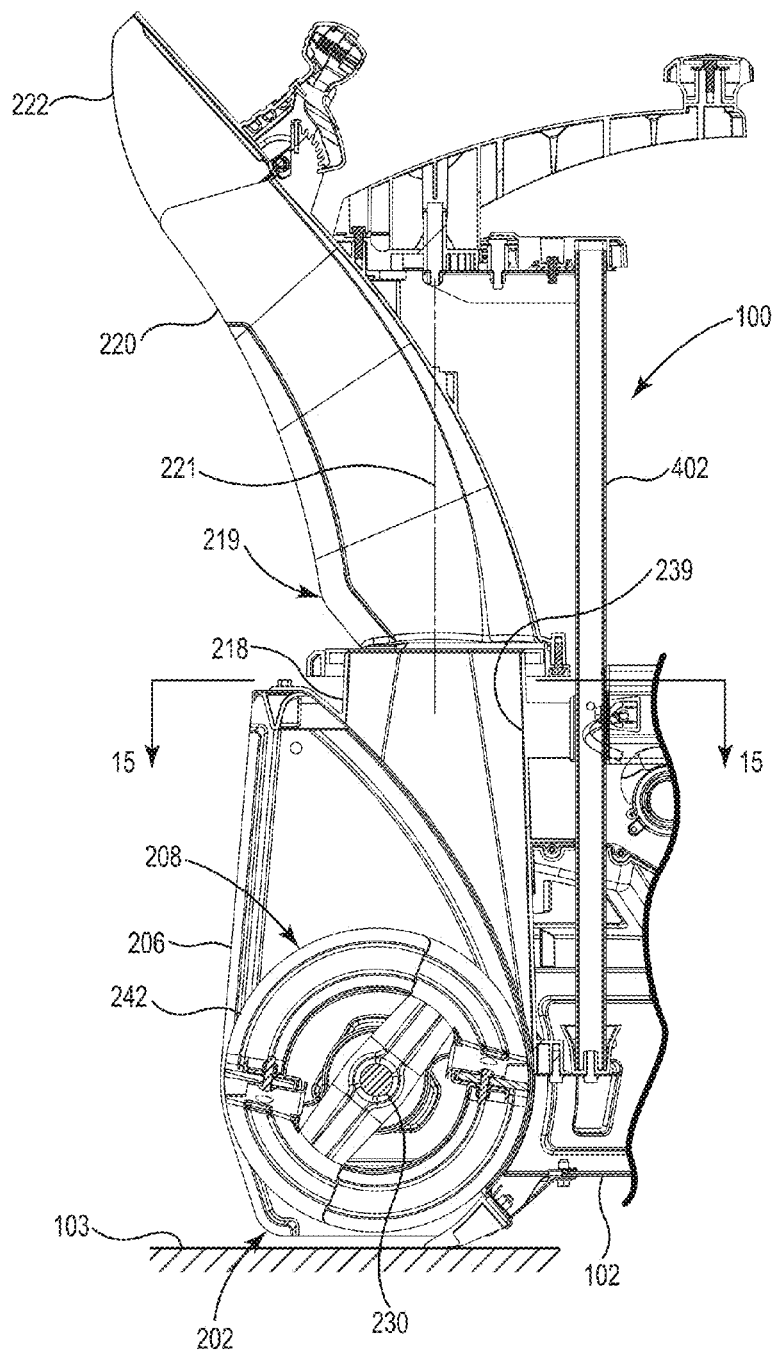
FIG. 14 is a section view similar to FIG. 13, but further illustrating an exemplary ejection chute and chute rotation control mechanism.

Other features of the exemplary snowthrower 100 may also contribute to effective snow ejection through the discharge chute 218. For example, as shown in FIG. 14, the discharge chute 218 may define the central chute axis 221 that extends normal to the operating plane/ground surface 103. That is, the rear surface 239 may, at least in the illustrated embodiments, extend vertically when the snowthrower is in an operating configuration as shown in FIG. 14. When combined with the negative rake angle 248 of the ejecting surfaces 246 (see, e.g., FIG. 13) as described above, the vertically oriented discharge chute/rear surface 239 may allow efficient ejection of snow without excessive loss of ejection energy due to, for example, collision of the snow with the inner surfaces of the housing/discharge chute, and without excessive ejection of snow back out through the collection opening 206. While the discharge chute 218 is illustrated as having a chute axis 221 that is vertical, the directional chute 220 of the illustrated embodiments may curve away from the chute axis (see, e.g., FIG. 14) to achieve the desired snow ejection pattern.

In conventional single-stage snowthrowers, an ejection baffle is often provided along an inside upper portion of the housing to block excessive forward ejection of snow. However, it has been found that embodiments of the snowthrower 100 may reduce the occurrence of forwardly ejected snow to a point wherein a substantially smaller ejection baffle (see, e.g., the optional baffle 203 in FIG. 1) may be used. In other embodiments, it could be possible to eliminate the ejection baffle altogether.

Figure 15A:
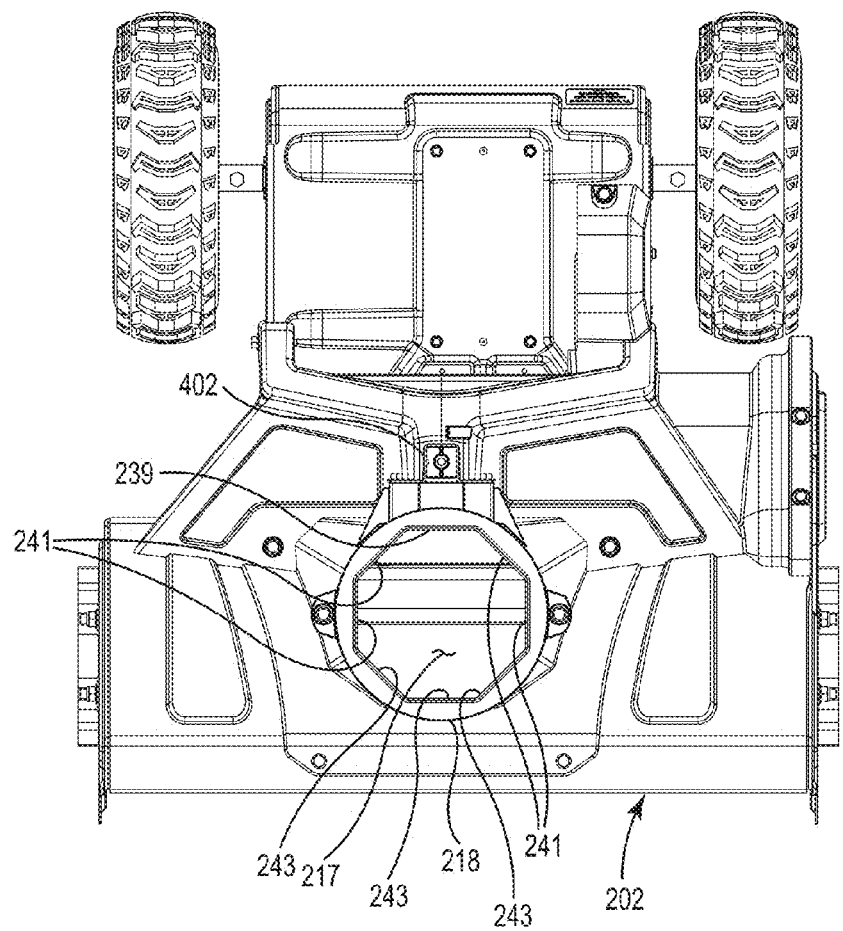
Figure 15B:
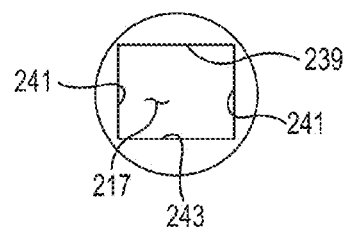

The exemplary housing assemblies 200 described herein provide other advantages. For example, FIGS. 15A-15B illustrate exemplary and alternative full internal cross-sectional views of the outlet 217/discharge chute 218 taken along line 15-15 of FIG. 14 (e.g., perpendicular to the discharge outlet/chute axis 221). As shown in these views, the rear surface 239 and transition walls 241 may, in conjunction with other inner walls 243, result in the housing 202/discharge chute 218 ultimately forming a polygonal shape near the outlet 217 when viewed in cross section. For example, the cross section of the discharge chute 218/outlet 217 may define a rectangular cross section (including a square) as shown in FIG. 15B, a hexagonal cross section, an octagonal cross section (as shown in FIG. 15A), or most any other polygonal shape.

It is believed that such a polygonal shape (provided by the rear surface 239, the transition walls 241, and the other inner walls 243) may assist with ejection efficiency (e.g., assist with directing ejected snow through the outlet) as compared to the more commonly-found circular shape. For example, these walls/surfaces appear to interfere with the tendency for ejected snow to helix or "cork-screw" as it travels upwardly from the rotor 208 toward the chute 218. Such a phenomena is known to occur in some round chute, single-stage snowthrowers, especially when snow is collected across less than all of the housing width.

Chute Rotation Control Mechanism

The exemplary chute rotation control mechanism 400 will now be described with reference to FIGS. 16-19. While described herein in the context of the self-propelled, single-stage snowthrower 100, those of skill in the art will note that the mechanism 400, as well as other aspects described and illustrated herein, may also find application to single-stage snowthrowers that lack powered wheels (i.e., wherein the wheels 106 may form simple ground support members), as well as to two-stage snowthrowers.

With reference first to FIGS. 16 and 17, the mechanism 400 may, at least in one embodiment, be supported by an upwardly extending support member 402 of the frame 102 (see also FIG. 14). In order to impart rotation to the directional chute 220 to change the snow ejection direction, a chute rotation lever 404 may be provided. The lever 404 may include a first or proximal end 406 attached to the directional chute 220. The lever 404 may extend radially away from the chute axis 221 to terminate at a second or distal end 408 (see, e.g., FIG. 19). The second end 408 may include a handle or knob 410 that is conveniently graspable by the operator. While shown as supported by the support member 402, other embodiments may eliminate the support member altogether, e.g., the lever may rigidly attach to the chute at the first end and extend outwardly without additional support.

Figure 18:
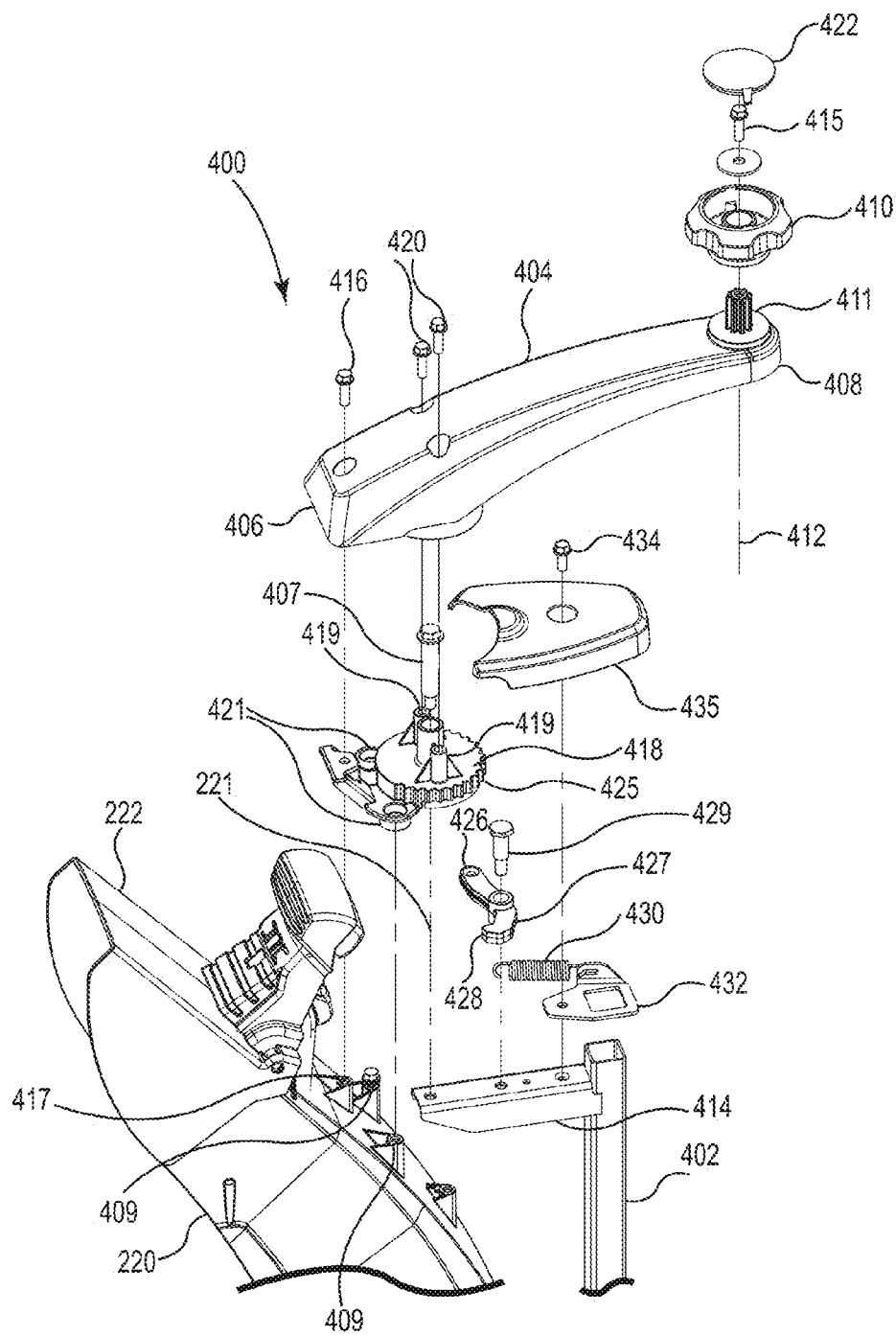
FIG. 18 is an exploded perspective view of the chute rotation control mechanism of FIGS. 16-17.
Figure 19:
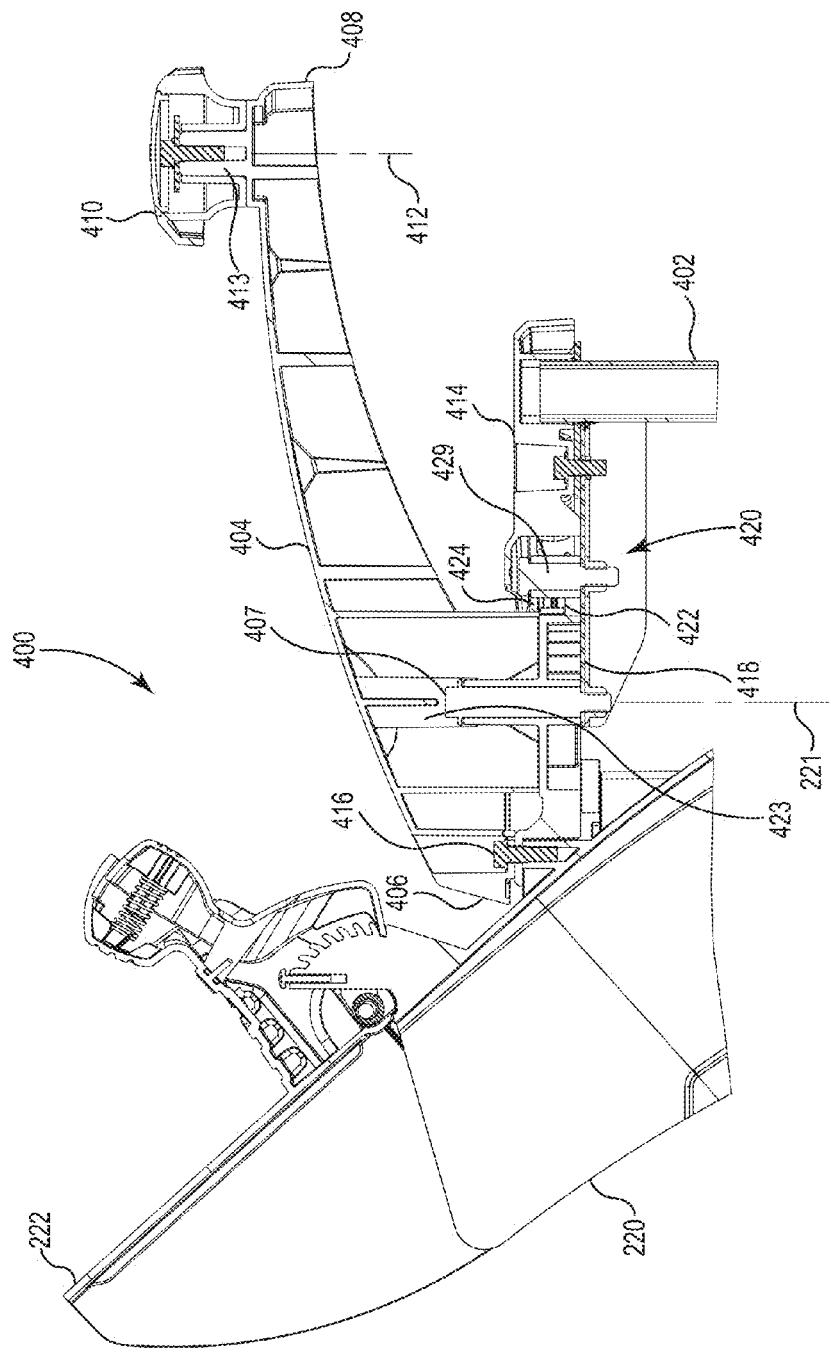
FIG. 19 is a section view of the chute rotation control mechanism of FIG. 16-18.

FIG. 18 is an exploded perspective view of the exemplary chute rotation control mechanism 400, and FIG. 19 illustrates the assembled mechanism in cross section. As shown in these views, the second end 408 of the lever 404 may include a handle (see FIG. 18). In one embodiment, the handle may be formed by the knob 410 as shown. For example, the lever 402 may form a receiver 411 at the second end 408. The receiver may be adapted to be received within an opening 413 on a bottom side of the knob 410 as shown more clearly in the cross sectional view of FIG. 19. A fastener 415 may secure the knob 410 to the lever 404 (e.g., to the handle 411) in such a manner that permits the knob to rotate freely about a handle axis 412 (relative to the lever 404) parallel to the chute axis 221.

In an alternate embodiment, the knob 410 may be optional, i.e., the receiver 411 may be configured as a rotating or non-rotating, smooth-surface handle (formed along the axis 412) that is suitable for grasping by the operator's hand directly. Accordingly, in either knobbed or knobless configurations, a handle may be provided that permits the operator to impart a rotational force to the lever 404, through the lever's entire range of motion, without requiring the operator to adjust or otherwise reposition his or her grip.

The support member 402 may hold a platform 414 operable to support the lever 404 and the associated mechanism structure. In the illustrated embodiment, the mechanism 400 includes an indexing member 418 which may be attached to the platform 414, e.g., with a shoulder bolt 407, the shoulder bolt 407 being threadably engagable with the platform as shown in FIG. 19. The shoulder bolt 407 may form a pivot joint between the first and second ends of the lever, the pivot joint defining a fixed lever pivot axis aligned (coincident) with the chute axis 221. As a result, the indexing member 418, and thus the lever 404, are adapted to rotate about the chute axis 221.

The indexing member 418 may further include a toothed perimeter 425 as shown in FIG. 18. The toothed perimeter is configured to interact with a pawl 427 having a finger 428. In the illustrated embodiment, the pawl 427 is adapted to pivot about a shoulder bolt 429 attached to the platform 414. The finger 428 may be biased, e.g., by a tension spring 430, into engagement with the toothed perimeter. A bracket 432 may be attached (e.g., fastened with a fastener 434) to the support member 402 and provide an anchor point for the spring 430. In one embodiment, the bracket 432 may include features that interact with the support member 402 (e.g., the bracket may include an opening that slides tightly over the shape of the support member as shown) to further rotationally fix the bracket. A cover 435 may be provided to protect the indexing member 418, spring 430, and the pawl 427.

To assemble the mechanism 400, the indexing member 418 may be attached to the platform 414 with the shoulder bolt 407, after which the pawl 427 may be attached to the platform using the shoulder bolt 429. The bracket 432 may then be engaged with (e.g., slide over) the support member 402. A first end of the spring 430 may then attach to an aperture 426 in the pawl 427, while a second end attaches to the bracket 432. Subsequently, the fastener 434 may be passed through the cover 435 and the fastener hole in the bracket and threaded into the platform 414.

To attach the indexing member 418 to the directional chute 220, fasteners (not shown) may pass with clearance through lugs 421 formed on the indexing member and threadably engage threaded holes 409 located on the directional chute. The lever 404 may then be placed over the indexing member 418 such that a recess 423 formed on the lower side of the lever 404 receives the shoulder bolt 407 with little or no radial clearance as shown in FIG. 19. A fastener 416 may then pass through an opening in the first end 406 of the lever 404 and threadably engage a threaded hole 417 formed in the directional chute 220. Similarly, fasteners 420 may pass through openings near the first end of the lever 404 and threadably engage respective threaded holes 419 formed in the indexing member 418.

The optional knob 410 may then be attached to the second end 408 of the lever 404 with the fastener 415. A cap 422 may be placed over the knob to cover the fastener head 415.

When the operator wishes to rotate the directional chute 220 (e.g., relative to the discharge chute and about the chute axis 221), the knob 410 (or receiver 411) may be grasped (e.g., by hand) and a rotational force imparted to the lever 404 to rotate the chute 220 about an axis of the shoulder bolt 407 (which axis is coincident with the chute axis 221). As the knob 410 is rotationally coupled to the lever 404, the lever may be moved through its entire range of motion (e.g., about 200 degrees) without requiring the operator to reposition his or her hand relative to the knob. That is, the lever may be operated in a manner similar to that of a manual automotive window crank.

In order to hold the directional chute 220/lever 404 in the desired location once the knob 410 is released, the indexing member 418/pawl 427 may act as a retention device. For example, the spring 430 may cause the finger 428 of the pawl 427 into biased engagement between adjacent teeth of the toothed perimeter 425 of the indexing member. As a result, once the indexing member 418 is rotationally positioned such that the finger 428 is biased into a valley between two teeth of the perimeter 425, the directional chute is held in place. To further rotate the directional chute 220, the operator applies a threshold torque to the lever (via the knob 410 and about the lever pivot axis) sufficient to cause the finger 428 to cam out of the valley of the toothed perimeter 425, at which point the indexing member, and thus the lever and directional chute, may rotate. Continued application of force to the knob 410 permits the lever 404 to continue pivoting until reaching its desired position.

Once the chute 220 is at the desired rotational position, the force applied to the knob 410 may be withdrawn by the operator, causing the finger 428 of the pawl 427 to again engage a valley between the two most proximate teeth on the toothed perimeter 425. The biasing force applied by the spring 430 is then sufficient to hold the indexing member 418 and the chute 220, in the set position until a threshold torque is again applied to the lever about the lever pivot axis. As a result of this construction, the operator may easily reposition the directional chute 220 by simply grasping the knob 410 (or the receiver 411) and rotating the lever 404 about the chute axis 221.

The deflector 222 may also be pivoted (e.g., about the axis 224 (see FIG. 1)) to control the elevational trajectory of the ejected snow. Because the discharge chute/chute axis 221 is vertical, an angle of the deflected snow may remain constant regardless of the rotational position of the directional chute.

While exemplary embodiments of the chute rotation control mechanism are described in detail above, it is to be understood that these embodiments are illustrative only and a variety of mechanisms may achieve the desired movement. For example, while shown as using a tension spring 430 to provide the biasing force to the pawl 427, other embodiments may use most any biasing mechanism, e.g., a torsion spring, an elastomeric element, etc. to achieve the desired effect. Moreover, while shown as a pawl 427 and gear tooth mechanism, most any device that provides sufficient friction to restrict unintentional rotation of the directional chute 220 may be utilized. Still further, in some embodiments, the chute rotation control mechanism may be replaced with, or include aspects of, other control mechanisms, see, e.g., U.S. Pat. No. 7,032,333 to Friberg et al.

The complete disclosure of the patents, patent documents, and publications cited herein are incorporated by reference in their entirety as if each were individually incorporated.

Illustrative embodiments are described and reference has been made to possible variations of the same. These and other variations, combinations, and modifications will be apparent to those skilled in the art, and it should be understood that the claims are not limited to the illustrative embodiments set forth herein.

What is claimed is:

1. A snowthrower comprising:
    a rotor housing defining a collection opening and a discharge outlet;
    a discharge chute attached to the housing and in fluid communication with the discharge outlet;
    a first drive member located near a first side of the housing and a second drive member located near a second side of the housing;
    a rotor partially enclosed by, and adapted to rotate within, the housing, the rotor adapted to both: collect snow that enters the housing through the collection opening; and eject the snow through the discharge outlet;
    a transmission comprising:
        an input shaft;
        independent first and second output axles operatively connecting the input shaft to the first and second drive members, respectively; and
        an axle gear operatively located between the input shaft and both of the first and second output axles, wherein the first output axle is adapted to de-clutch from the axle gear when a speed of the first output axle exceeds a driven speed of the axle gear; and
    a prime mover operatively attached to the housing and adapted to provide power to both the rotor and the transmission.

2. The snowthrower of claim 1, wherein the transmission is adapted to vary a speed of the first and second output axles.

3. The snowthrower of claim 2, wherein the transmission continuously varies the speed of the first and second output axles.

4. The snowthrower of claim 2, wherein the speed of the first and second output axles vary based upon an input provided by an operator speed control device associated with the snowthrower.

5. The snowthrower of claim 1, wherein the second output axle is adapted to remain engaged to the axle gear when the first output axle de-clutches.

6. A snowthrower comprising:
    a frame comprising lateral first and second sides;
    first and second drive members located on or near the first and second sides of the frame, respectively;
    a rotor housing attached to the frame, the rotor housing defining a partially enclosed volume having a collection opening and a discharge outlet;
    a discharge chute operatively attached to the rotor housing and in fluid communication with the discharge outlet;
    a rotor connected to the rotor housing and adapted to rotate about a first axis within the partially enclosed volume, wherein the rotor comprises a first portion adapted to transport snow in a direction parallel to the first axis, and a second portion comprising a paddle offset from, and adapted to rotate about, the first axis, the paddle adapted to eject the snow outwardly through the discharge chute;
    a transmission attached to the frame, the transmission comprising:
        an input shaft;
        independent first and second output axles attached to the first and second drive members, respectively, wherein the transmission is adapted to synchronously drive the first and second output axles at a user-selectable, variable speed; and
        an axle gear operatively located between the input shaft and both of the first and second output axles, wherein the first output axle is adapted to de-clutch from the axle gear when a speed of the first output axle exceeds a driven speed of the axle gear; and
    a prime mover attached to the frame and adapted to provide power to both the rotor and the input shaft of the transmission.

7. The snowthrower of claim 6, wherein the second output axle is adapted to remain engaged to the axle gear when the first output axle de-clutches.

8. The snowthrower of claim 6, wherein the first output axle is adapted to de-clutch from the axle gear when the snowthrower is turned.

9. The snowthrower of claim 6, wherein the prime mover is attached to the frame at a location selected to approximately equalize a weight supported by each of the first and second drive members.

10. The snowthrower of claim 6, further comprising a speed control device adapted to selectively engage and disengage the drive members.

11. The snowthrower of claim 6, further comprising a speed control device adapted to alter the speed of the drive members.

12. The snowthrower of claim 6, further comprising a rotor control device adapted to selectively engage and disengage the rotor.

13. The snowthrower of claim 6, further comprising a handle assembly extending rearwardly from the frame, the handle assembly comprising an operator control area.

14. The snowthrower of claim 6, wherein the transmission further comprises:
   a variable engagement clutch having a first portion in mechanical engagement with the input shaft and a second portion in mechanical engagement with the axle gear; and
   first and second jaw clutches disposed between the axle gear and the first and second output axles, respectively.

15. The snowthrower of claim 14, wherein manipulation of the variable engagement clutch causes the driven speed of the axle gear to change while a speed of the input shaft remains constant.

16. The snowthrower of claim 14, wherein the first jaw clutch de-clutches the first output axle from the axle gear when the speed of the first output axle exceeds the driven speed of the axle gear.

17. A snowthrower comprising:
   a frame comprising first and second sides;
   first and second drive wheels located on or near the first and second sides of the frame, respectively;
   a rotor housing attached to the frame, the rotor housing defining a partially enclosed volume having a collection opening and a discharge outlet;
   a discharge chute operatively attached to the rotor housing and in fluid communication with the discharge outlet;
   a rotor connected to the rotor housing and adapted to rotate within the partially enclosed volume about a first axis, wherein the rotor comprises a first portion adapted to transport snow received through the collection opening, and a second portion also adapted to rotate about the first axis, the second portion adapted to eject the snow outwardly through the discharge chute;
   a transmission attached to the frame, the transmission comprising:
      an input shaft;
      independent first and second output axles attached to the first and second drive wheels, respectively, wherein the transmission is adapted to synchronously drive the first and second output axles at a variable speed; and
      an axle gear operatively located between the input shaft and both of the first and second output axles, wherein the first output axle is adapted to de-clutch from the axle gear when a speed of the first output axle exceeds a driven speed of the axle gear; and
   a prime mover attached to the frame and adapted to provide power to both the rotor and the input shaft of the transmission.

18. The snowthrower of claim 17, wherein the second axle is adapted to remain engaged to the axle gear when the first output axle de-clutches.

* * * * *